United States Patent
Watanabe et al.

(10) Patent No.: US 10,276,866 B2
(45) Date of Patent: *Apr. 30, 2019

(54) ELECTRIC DEVICE

(71) Applicant: Nissan Motor Co., Ltd., Yokohama-shi, Kanagawa (JP)

(72) Inventors: Manabu Watanabe, Kanagawa (JP); Tomohiro Kaburagi, Kanagawa (JP); Youichi Yoshioka, Kanagawa (JP); Hirokazu Komatsu, Kanagawa (JP); Nobutaka Chiba, Kanagawa (JP); Shinji Yamamoto, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/537,270

(22) PCT Filed: Dec. 17, 2014

(86) PCT No.: PCT/JP2014/083478
§ 371 (c)(1),
(2) Date: Jun. 16, 2017

(87) PCT Pub. No.: WO2016/098212
PCT Pub. Date: Jun. 23, 2016

(65) Prior Publication Data
US 2017/0346087 A1 Nov. 30, 2017

(51) Int. Cl.
| | | |
|---|---|---|
| *H01M 4/36* | (2006.01) | |
| *H01M 4/38* | (2006.01) | |
| *H01M 10/052* | (2010.01) | |
| *B22F 9/00* | (2006.01) | |
| *C22C 1/04* | (2006.01) | |
| *C22C 1/10* | (2006.01) | |
| *C22C 29/18* | (2006.01) | |
| *B22F 9/04* | (2006.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC ............ *H01M 4/386* (2013.01); *B22F 9/002* (2013.01); *B22F 9/04* (2013.01); *C22C 1/0483* (2013.01); *C22C 1/0491* (2013.01); *C22C 1/1084* (2013.01); *C22C 29/18* (2013.01); *H01M 4/505* (2013.01); *H01M 4/525* (2013.01); *H01M 10/052* (2013.01); *H01M 10/0525* (2013.01); *B22F 2009/041* (2013.01); *H01M 2004/027* (2013.01); *H01M 2220/20* (2013.01); *Y02E 60/122* (2013.01); *Y02T 10/7011* (2013.01)

(58) Field of Classification Search
CPC ...... H01M 4/366; H01M 4/386; H01M 4/525; H01M 4/505; H01M 4/134; H01M 4/131; H01M 10/0525
See application file for complete search history.

(56) References Cited

U.S. PATENT DOCUMENTS

| | | |
|---|---|---|
| 2005/0287439 A1 | 12/2005 | Shimamura et al. |
| 2006/0040182 A1 | 2/2006 | Kawakami et al. |
| 2007/0148544 A1 | 6/2007 | Le |
| 2008/0113271 A1 | 5/2008 | Ueda et al. |
| 2009/0061322 A1 | 3/2009 | Kawakami et al. |
| 2010/0233543 A1 | 9/2010 | Numata et al. |
| 2011/0117449 A1 | 5/2011 | Le |
| 2013/0236788 A1 | 9/2013 | Tsunozaki et al. |
| 2014/0356718 A1 | 12/2014 | Ito et al. |
| 2016/0141613 A1* | 5/2016 | Miki ............... H01M 4/386 252/182.1 |
| 2016/0336593 A1* | 11/2016 | Honda ............ H01M 4/366 |

FOREIGN PATENT DOCUMENTS

| | | |
|---|---|---|
| EP | 2800176 A1 | 11/2014 |
| JP | 2004311429 A | 11/2004 |
| JP | 2008305775 A | 12/2008 |
| JP | 2009521792 A | 6/2009 |
| JP | 2014107132 A | 6/2014 |
| WO | 03079469 A1 | 9/2003 |
| WO | 2006129415 A1 | 12/2006 |
| WO | 2012057289 A1 | 5/2012 |
| WO | 2014199785 A1 | 12/2014 |
| WO | WO 2015/111189 | * 7/2015 |

OTHER PUBLICATIONS

Xiaofeng Zhang et al., Structural and Electrochemical Study of Al2O3 and TiO2 Coated Li1.2Ni0.13Mn0.54Co0.13O2 Cathode Material Using ALD, Advanced Energy Materials, 2013, pp. 1299-1307, vol. 3 (10).

Won-Sub Yoon, et al., Local Structure and Cation Ordering in O3 Lithium Nickel Manganese Oxides with Stoichiometry Li[NixMn(2-x)/3Li(1-2x)/3]O2, Electrochemical and Solid-State Letters, 2004, pp. A167-A171, vol. 7 (7), The Electrochemical Society.

* cited by examiner

*Primary Examiner* — Laura Weiner
(74) *Attorney, Agent, or Firm* — Young Basile Hanlon & MacFarlane, P.C.

(57) ABSTRACT

In an electric device the negative electrode active material layer includes a silicide phase containing a silicide of a transition metal is dispersed in a parent phase containing amorphous or low crystalline silicon as a main component, a predetermined composition, and a ratio value (B/A) of a diffraction peak intensity B of a silicide of a transition metal in a range of $2\theta=37$ to $45°$ to a diffraction peak intensity A of a (111) plane of Si in a range of $2\theta=24$ to $33°$ in a predetermined range in an X-ray diffraction measurement using a CuK$\alpha$1 ray is used as a Si-containing alloy. A solid solution or an oxide-coated solid solution in which a coating layer containing an oxide in a predetermined amount is formed on the particle surface of the solid solution and is used in the positive electrode active material layer.

11 Claims, 5 Drawing Sheets

ELECTRIC DEVICE

TECHNICAL FIELD

The present invention relates to an electric device. The electric device according to the present invention is used in a driving power source and an auxiliary power source for motors of vehicles such as electric vehicles, fuel cell vehicles, and hybrid electric vehicles as secondary batteries, capacitors, and the like.

BACKGROUND

In recent years, cut down of the amount of carbon dioxide has been ardently desired in order to cope with global warming. In the motor vehicle industry, cut down of carbon dioxide emissions due to introduction of electric vehicles (EV) and hybrid electric vehicles (HEV) has been highly expected, and development of electric devices such as secondary batteries for driving motors, which hold the key to practical use of these has been actively carried out.

The secondary batteries for driving motors are required to exhibit extremely high-output characteristics and high energy as compared to consumer lithium ion secondary batteries to be used in mobile phones, notebook computers, and the like. Hence, lithium ion secondary batteries having the highest theoretical energy among all the batteries have attracted attention, and development thereof is rapidly advanced at present.

A lithium ion secondary battery generally has a configuration in which a positive electrode in which a positive electrode active material and the like are coated on both sides of a positive electrode current collector by using a binder and a negative electrode in which a negative electrode active material and the like are coated on both sides of a negative electrode current collector by using a binder are connected to each other via an electrolyte layer and housed in a battery case.

Hitherto, a carbon and graphite-based material, which is advantageous from the viewpoint of lifespan of charge and discharge cycles and cost, has been used in the negative electrode of a lithium ion secondary battery. However, in the case of a carbon and graphite-based negative electrode material, charge and discharge proceed by occlusion and release of lithium ions into and from the graphite crystals, and there is thus a disadvantage that a charge and discharge capacity that is equal to or higher than the theoretical capacity, 372 mAh/g, to be obtained from $LiC_6$ of the maximum lithium-introduced compound is not obtained. For this reason, it is difficult to obtain a capacity and an energy density which satisfy the practical use level of a vehicle application from a carbon and graphite-based negative electrode material.

In contrast, a battery using a material to be alloyed with Li in the negative electrode is expected as a negative electrode material in a vehicle application since the energy density is improved as compared to a conventional carbon and graphite-based negative electrode material. For example, a Si material occludes and releases 3.75 mol of lithium ions per 1 mol as in the following Reaction Formula (A) in charge and discharge, and the theoretical capacity is 3600 mAh/g in $Li_{15}Si_4$ (=$Li_{3.75}Si$).

[Chemical Formula 1]

$$Si + 3.75 Li^+ + e^- \rightleftharpoons Li_{3.75}Si \quad (A)$$

However, in a lithium ion secondary battery using a material to be alloyed with Li in the negative electrode, expansion and contraction of the negative electrode at the time of charge and discharge is great. For example, the volume expansion in the case of occluding a Li ion is about 1.2 times for a graphite material, but a great volume change (about 4 times) occurs for the Si material since the amorphous state is converted to a crystalline state when Si and Li are alloyed, and there is thus a problem that the cycle lifespan of the electrode decreases. In addition, in the case of a Si negative electrode active material, the capacity and the cycle durability have a trade-off relationship, and there is thus a problem that it is difficult to improve the cycle durability while having a high capacity.

Here, WO 2006/129415 A discloses an invention aimed to provide a nonaqueous electrolyte secondary battery including a negative electrode pellet having a high capacity and an excellent cycle lifespan. Specifically, a silicon-containing alloy is disclosed which is obtained by mixing and wet pulverizing a silicon powder and a titanium powder by a mechanical alloying method and in which a material including a first phase containing silicon as a main body and a second phase containing a silicide of titanium ($TiSi_2$ or the like) is used as a negative electrode active material. It is also disclosed that at least either of these two phases is amorphous or low crystalline.

Here, when a negative electrode as described in WO 2006/129415 A is combined with a positive electrode using a solid-solution positive electrode active material exhibiting high capacity characteristics, it is possible to take advantage of the high capacity characteristics which are a feature of a solid-solution positive electrode active material since the negative electrode also has a high capacity, and it is also possible to realize an excellent capacity profile as a cell. However, according to the investigations by the present inventors, it has been revealed that there is a problem that sufficient cycle durability cannot be obtained by a combination of these positive and negative electrodes.

SUMMARY

In view of the above circumstances, an object of the present invention is to provide a means capable of realizing sufficient cycle durability while sufficiently taking advantage of the high capacity characteristics which are a feature of a solid-solution positive electrode active material in an electric device such as a lithium ion secondary battery having a positive electrode using a solid-solution positive electrode active material.

In order to solve the above problems, the present inventors have carried out intensive researches. As a result, it has been found out that the above problems can be solved by using a negative electrode containing a predetermined Si-containing alloy as a negative electrode active material and a positive electrode containing a predetermined solid-solution positive electrode active material in combination, whereby the present invention has been completed.

That is, the present invention relates to an electric device having a power generating element including a positive electrode in which a positive electrode active material layer containing a positive electrode active material is formed on the surface of a positive electrode current collector, a negative electrode in which a negative electrode active material layer containing a negative electrode active material is formed on the surface of a negative electrode current collector, and a separator.

Moreover, the negative electrode active material layer contains a negative electrode active material represented by the following Formula (1):

[Mathematical Formula 1]

$$\alpha(\text{Si-containing alloy}) \quad (1)$$

(in Formula (1) above, α represents a percent by weight of each component in the negative electrode active material layer and 40<α≤98). In addition, the positive electrode active material layer contains a positive electrode active material represented by the following Formula (2):

[Mathematical Formula 2]

$$e\,(\text{Solid-solution positive electrode active material}) \quad (2)$$

(in Formula (2) above, e represents a percent by weight of each component in the positive electrode active material layer and 80≤e≤98).

At this time, the Si-containing alloy has a structure in which a silicide phase containing a silicide of a transition metal is dispersed in a parent phase containing amorphous or low crystalline silicon as a main component and a composition represented by the following Chemical Formula (I):

[Chemical Formula 2]

$$Si_xSn_yM_zA_a \quad (I)$$

(in Chemical Formula (I) above, A is unavoidable impurities, M is one or two or more transition metal elements, x, y, z, and a represent values of percent by mass, and 0<x<100, 0≤y<100, 0<z<100, and 0≤a<0.5 and x+y+z+a=100), and a ratio value (B/A) of a diffraction peak intensity B of a silicide of a transition metal in a range of 2θ=37 to 45° to a diffraction peak intensity A of a (111) plane of Si in a range of 2θ=24 to 33° is 0.41 or more in an X-ray diffraction measurement of the Si-containing alloy using a CuKα1 ray.

Moreover, the solid-solution positive electrode active material contains a solid solution having a composition represented by the following Formula (3):

[Chemical Formula 3]

$$Li_{1.5}[Ni_aMn_bCo_c[Li]_d]O_z \quad (3)$$

(in Formula (3) above, z represents the number of oxygen satisfying the valence, a+b+c+d=1.5, 0.1≤d≤0.4, and 1.1≤[a+b+c]≤1.4) or an oxide-coated solid solution in which a coating layer containing an oxide or composite oxide of a metal selected from the group consisting of Al, Zr, and Ti is formed on a particle surface of the solid solution having a composition represented by Formula (3) above, and wherein a content of the oxide or composite oxide in the solid-solution positive electrode active material is from 0.1 to 3.0% by weight in terms of oxide.

DESCRIPTION OF THE EMBODIMENTS

Figure 1:
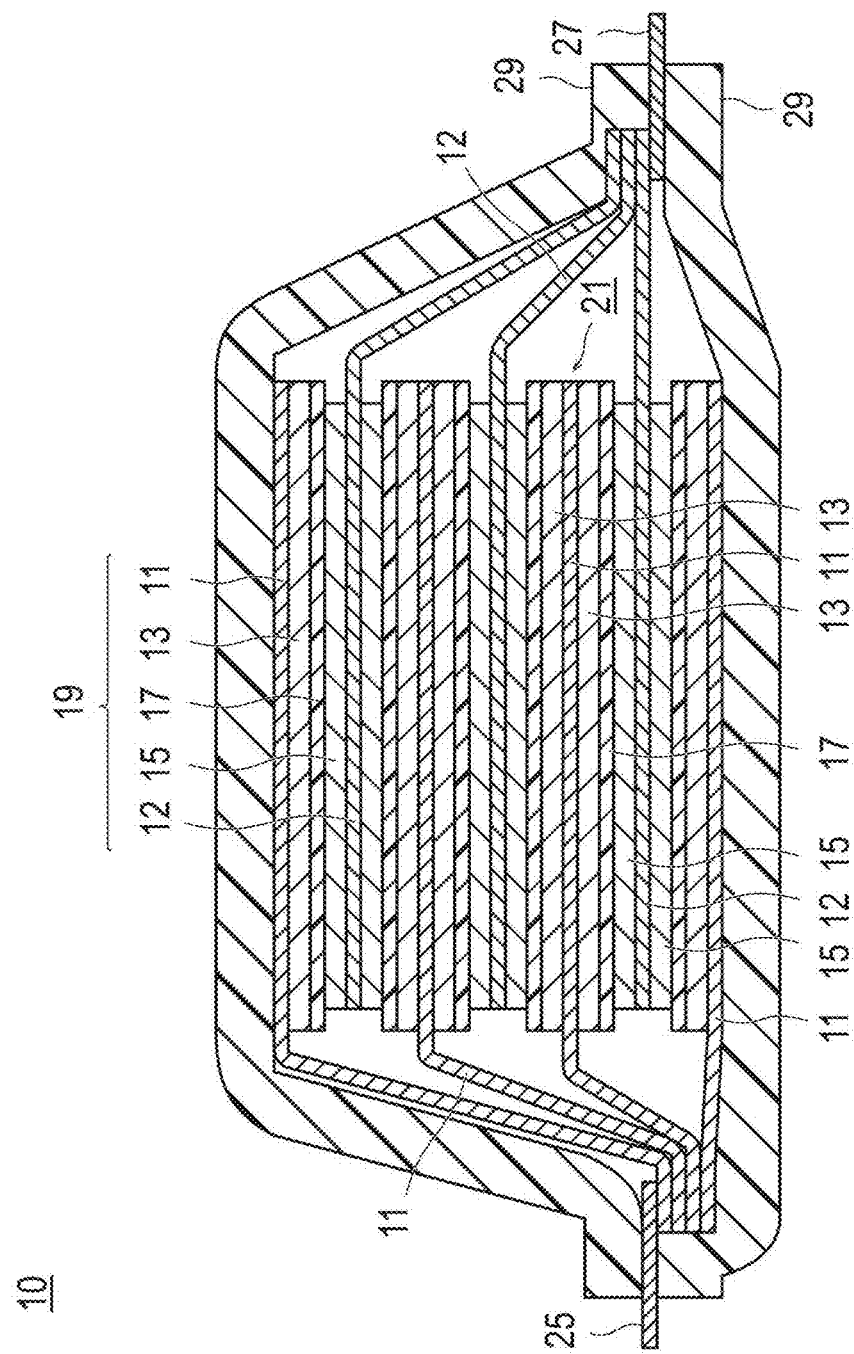
FIG. 1 is a cross-sectional schematic view which illustrates a basic configuration of a flat (stacked) type non-bipolar nonaqueous electrolyte lithium ion secondary battery of an embodiment of an electric device according to the present invention.

According to an embodiment of the present invention, an electric device is provided which has a power generating element including a positive electrode in which a positive electrode active material layer containing a positive electrode active material is formed on the surface of a positive electrode current collector, a negative electrode in which a negative electrode active material layer containing a negative electrode active material is formed on the surface of a negative electrode current collector, and a separator, and in which the negative electrode active material layer contains a negative electrode active material represented by the following Formula (1):

[Mathematical Formula 3]

$$\alpha(\text{Si-containing alloy}) \quad (1)$$

(in Formula (1) above, α represents the percent by weight of each component in the negative electrode active material layer and 40<α≤98), the positive electrode active material layer contains a positive electrode active material represented by the following Formula (2):

[Mathematical Formula 4]

$$e\,(\text{Solid-solution positive electrode active material}) \quad (2)$$

(in Formula (2) above, e represents the percent by weight of each component in the positive electrode active material layer and 80≤e≤98), and wherein, the Si-containing alloy has a structure in which a silicide phase containing a silicide of a transition metal is dispersed in a parent phase containing amorphous or low crystalline silicon as a main component and a composition represented by the following Chemical Formula (I):

[Chemical Formula 4]

$$Si_xSn_yM_zA_a \quad (I)$$

(in Chemical Formula (I) above, A is unavoidable impurities, M is one or two or more transition metal elements, x, y, z, and a represent values of percent by mass, and 0<x<100, 0≤y<100, 0<z<100, and 0≤a<0.5 and x+y+z+a=100), a ratio value (B/A) of a diffraction peak intensity B of a silicide of a transition metal in a range of 2θ=37 to 45° to a diffraction peak intensity A of a (111) plane of Si in a range of 2θ=24 to 33° is 0.41 or more in an X-ray diffraction measurement of the Si-containing alloy using a CuKα1 ray, and the solid-solution positive electrode active material contains a solid solution having a composition represented by the following Formula (3):

[Chemical Formula 5]

$$Li_{1.5}[Ni_aMn_bCo_c[Li]_d]O_x \quad (3)$$

(in Formula (3) above, z represents the number of oxygen satisfying the valence, a+b+c+d=1.5, 0.1≤d≤0.4, and 1.1≤[a+b+c]≤1.4) or an oxide-coated solid solution in which a coating layer containing an oxide or composite oxide of a metal selected from the group consisting of Al, Zr, and Ti is formed on a particle surface of the solid solution having a composition represented by Formula (3) above, and wherein a content of the oxide or composite oxide in the solid-solution positive electrode active material is from 0.1 to 3.0% by weight in terms of oxide.

According to the present invention having such a configuration, the phase transition between an amorphous state and a crystalline state (crystallization into $Li_{15}Si_4$) when Si is alloyed with Li is suppressed as the value of B/A in the negative electrode active material (Si-containing alloy) is in the range described above. This suppresses expansion and contraction of the Si-containing alloy constituting the negative electrode active material in a charge and discharge process of the electric device. As a result, the electric device according to the present invention can realize sufficient cycle durability while sufficiently taking advantage of the high capacity characteristics which are a feature of a solid-solution positive electrode active material.

Hereinafter, a basic configuration of an electric device according to the present invention will be described with reference to the drawings. In the present embodiment, a lithium ion secondary battery will be described as an example of the electric device.

First, in a lithium ion secondary battery using the electric device according to the present invention, the voltage of the cell (single battery layer) is great and a high-energy density and a high-output density can be achieved. For this reason, a lithium ion secondary battery of the present embodiment is excellent for driving power source and auxiliary power source of a vehicle. As a result, it can be suitably used as a lithium ion secondary battery for driving power and the like of a vehicle. In addition to this, it can also be sufficiently applied to a lithium ion secondary battery for mobile devices such as mobile phones.

In the case of distinguishing the lithium ion secondary battery by the form and structure, for example, it can be applied to any conventionally known form and structure such as a stacked type (flat type) battery and a wound type (cylindrical type) battery. It is advantageous to employ a stacked type (flat type) battery structure from the viewpoint of cost and workability since long-term reliability can be secured by a simple sealing technique such as thermocompression bonding.

In addition, in the case of considering the electrical connection form (electrode structure) in the lithium ion secondary battery, the lithium ion secondary battery can be applied to both a non-bipolar (internal parallel connection type) battery and a bipolar (internal series connection type) battery.

In the case of distinguishing the lithium ion secondary battery by the type of the electrolyte layer therein, the lithium ion secondary battery can also be applied to batteries having any conventionally known type of electrolyte layer such as a solution electrolyte type battery using a solution electrolyte such as a nonaqueous electrolytic solution in the electrolyte layer and a polymer battery using a polymer electrolyte in the electrolyte layer. The polymer battery is classified into a gel electrolyte type battery using a polymer gel electrolyte (also simply referred to as a gel electrolyte) and a solid polymer (all-solid) type battery using a polymer solid electrolyte (also simply referred to as a polymer electrolyte).

Accordingly, in the following description, as an example of a lithium ion secondary battery of the present embodiment, a non-bipolar (internal parallel connection type) lithium ion secondary battery will be significantly briefly described with reference to the drawings. However, the technical scope of the lithium ion secondary battery of the present embodiment is not limited to these.

<Overall Structure of Battery>

FIG. 1 is a cross-sectional schematic view which schematically illustrates the overall structure of a flat type (stacked type) lithium ion secondary battery (hereinafter, also simply referred to as the "stacked type battery") of a representative embodiment of the electric device according to the present invention.

As illustrated in FIG. 1, a stacked type battery 10 of the present embodiment has a structure in which a substantially rectangular power generating element 21 in which a charge and discharge reaction actually proceeds is sealed in the interior of a laminate sheet 29 of an outer package. Here, the power generating element 21 is configured to stack a positive electrode in which a positive electrode active material layer 15 is disposed on both sides of a positive electrode current collector 12, an electrolyte layer 17, and a negative electrode in which a negative electrode active material layer 13 is disposed on both sides of a negative electrode current collector 11. Specifically, the negative electrode, the electrolyte layer, and the positive electrode are stacked in this order such that one positive electrode active material layer 15 and the adjacent negative electrode active material layer 13 face each other via the electrolyte layer 17.

By this, the adjacent positive electrode, electrolyte layer, and negative electrode constitute one single battery layer 19. Hence, it can also be said that the stacked type battery 10 illustrated in FIG. 1 has a configuration in which a plurality of single battery layers 19 are stacked to be electrically connected in parallel. Incidentally, the positive electrode active material layer 15 is disposed only on one side of each of the outermost positive electrode current collectors to be positioned at both outermost layers of the power generating element 21, but the active material layer may be provided on both sides thereof. That is, a current collector which has an active material layer only on one side and is thus dedicated to the outermost layer is not prepared but a current collector having an active material layer on both sides may be used as it is as the outermost current collector. In addition, the positive electrode and the negative electrode may be reversely disposed from FIG. 1 so that the outermost negative electrode current collector is positioned at both outermost layers of the power generating element 21, and the negative electrode active material layer may be disposed on one side or both sides of the outermost negative electrode current collector.

A positive electrode current collecting plate 25 and a negative electrode current collecting plate 27 which are electrically connected to the respective electrodes (the positive electrode and the negative electrode) have a structure in which they are respectively attached to the positive electrode current collector 12 and the negative electrode current collector 11 and led to the outside of the laminate sheet 29 so as to be sandwiched between the end portions of the laminate sheet 29. The positive electrode current collecting plate 25 and the negative electrode current collecting plate 27 may be respectively attached to the positive electrode current collector 12 and the negative electrode current collector 11 of the respective electrodes via a positive electrode lead and a negative electrode lead (not illustrated) by ultrasonic welding, resistance welding, or the like if necessary.

The lithium ion secondary battery according to the present embodiment is characterized by the configuration of a positive electrode and a negative electrode. The important constituent members of the battery including the positive electrode and the negative electrode will be described below.

<Active Material Layer>

The active material layers (13 and 15) contain an active material, and they further contain other additives if necessary.

[Positive Electrode Active Material Layer]

The positive electrode active material layer 15 at least contains a positive electrode active material (also referred to as the "solid-solution positive electrode active material" in the present specification) composed of a solid solution material.

(Solid-Solution Positive Electrode Active Material)

The solid-solution positive electrode active material is composed of a solid solution having a composition represented by the following Formula (3) or an oxide-coated solid solution in which a coating layer containing an oxide or composite oxide of a metal selected from the group consisting of Al, Zr, and Ti is formed on the particle surface of the solid solution having a composition represented by Formula (3) above.

[Chemical Formula 6]

$$Li_{1.5}[Ni_aMn_bCo_c[Li]_d]O_z \qquad (3)$$

In Formula (3), z represents the number of oxygen satisfying the valence, a+b+c+d=1.5, 0.1≤d≤0.4, and 1.1≤[a+b+c]≤1.4.

Incidentally, in a case in which the solid-solution positive electrode active material is composed of the oxide-coated solid solution, the content of the oxide or composite oxide in the solid-solution positive electrode active material is from 0.1 to 3.0% by weight in terms of oxide. At this time, the specific constitution of the metal oxide present on the particle surface of the solid-solution positive electrode active material is not particularly limited, and any of theoretically formable oxides or composite oxides containing the metal elements described above can be used. $Al_2O_3$, $ZrO_2$, or $TiO_2$ is preferably used. Incidentally, the coating layer may further contain a (composite) oxide containing other elements as one kind or two or more kinds selected from the group consisting of Nb, Sn, W, Mo, and V. Incidentally, in the present invention, the solid-solution positive electrode active material is preferably composed of the oxide-coated solid solution described above. By using a positive electrode active material having such a constitution, it is possible to suppress particularly a change in crystal structure due to repeated charge and discharge cycles (for example, 4.3 to 4.5 V) after the activation treatment at a high electric potential (for example, 4.4 to 4.8 V) to be equal to or higher than the plateau potential. In addition, by forming a predetermined coating layer on the particle surface of the solid-solution positive electrode active material, the transition metal (Mn) which does not form a spinel phase (not immobilized) but elutes out of the crystal structure decreases when Mn in the transition metal layer moves to the Li layer and a part of Mn undergoes phase transition to a spinel phase in association with the activation, and further improvement in performance and durability can be thus attained.

Furthermore, in the present embodiment, it is preferable that a part of the metal element in the coating layer penetrates (having a region in which the metal element is present) into the surface layer of the particles of the solid-solution positive electrode active material. This enhances the covalent bond of the metal element with oxygen, and as a result, the departure of lattice oxygen accompanying the oxidation of other transition metals decreases, so that the generation of oxygen gas decreases and the generation of oxygen defects in the crystal structure also decreases. In addition, the crystal structure is stabilized and the departure of oxygen decreases even when the charge and discharge cycle is repeated in the vicinity of the plateau potential (4.3 to 4.5 V) or the electric device is exposed to the electric potential in the vicinity of the plateau potential for a long period of time, and thus the elution accompanying oxidation of the transition metal (such as Mn) constituting the solid-solution active material is suppressed and the improvement in performance and durability can be attained. Furthermore, the particle surface layer (up to 20 nm, even up to 30 nm) of the solid-solution positive electrode active material to be most unstable is stabilized by coating with the (composite) oxide and penetration of the metal element, and even further improvement in performance and durability can be thus attained. In addition, the metal element of the coating layer does not penetrate into and does not substitute the particles (bulk), the intercalation and deintercalation of Li accompanying the oxidation and reduction of Ni and Mn in the bulk is thus not hindered, and a high capacity can be thus obtained.

In the present embodiment, suppression of elution of transition metals ($Mn^{4+}$, $Ni^{2+}$) and departure of oxygen from the crystal structure of the surface layer can be attained by the presence of the coating layer. Furthermore, improvement in Li diffusibility (Li conductivity) can be attained by forming a (metal-Li) compound at the interface between the coating layer and the solid-solution positive electrode active material (providing a region in which a metal element is present on the active material side). As a result, it is possible to decrease not only the interface resistance but also the Li diffusion resistance in the particles. Such a decrease in resistance and improvement in Li diffusibility can improve the battery performance (capacity, rate characteristics, and cycle characteristics). In addition, by suppressing elution of the transition metal, it is possible to suppress a decrease in average voltage accompanying the cycle progress as well as to suppress the reaction between the surface layer of the solid-solution active material (particles) and the electrolytic solution.

In the present embodiment, as the confirmation of having a region in which a metal element constituting the coating layer is present on the solid-solution positive electrode active material side at the interface between the particles of the solid-solution positive electrode active material and the coating layer, it is possible to qualitatively confirm that a metal element is present in the surface layer of the active material particles by using a high-resolution measuring apparatus. As the analyzer (analysis method), it is possible to use an XPS (X-ray photoelectron spectroscopy), a TEM-EDX (transmission electron microscope-energy dispersive X-ray spectroscopy), a STEM-EDX/EELS (scanning transmission electron microscope-energy dispersive X-ray spectroscopy/electron energy loss spectroscopic analyzer), a HAADF-STEM (high angle scattering dark field-scanning transmission electron microscope image), and the like.

Incidentally, the thickness (average thickness) of the coating layer is not particularly limited, but it is preferably from 2 to 20 nm from the viewpoint of improving the characteristics of the solid-solution positive electrode active material as described above. The measuring method of the average thickness of the coating layer can be conducted by using an observation image taken by a SEM or TEM, for example. In addition to this, the average particle diameter of the solid-solution active material described above and the average particle diameter of the positive electrode active material provided with the alumina layer may be measured by using a particle size distribution measuring apparatus for a laser diffraction and scattering method, and the difference between them may be taken as the average thickness of the alumina layer.

In addition, the presence proportion of the coating layer on the particle surface of the solid-solution positive electrode active material is also not particularly limited, and it is most preferably 100% by area, but it may be 20% by area or more and preferably 50% by area or more from the viewpoint of exerting the effect of the present embodiment.

The solid-solution positive electrode active material having a coating layer as described above can be prepared, for example, by a method including a step of coating a metal oxide on the surface of a solid-solution active material represented by Composition Formula (1): $Li_{1.5}[Ni_aMn_bCo_c[Li]_d[X]_e]O_z$ (where, X is at least one kind selected from Ti, Zr, and Nb, $0<e<0.5$, $a+b+c+d+e=1.5$, $0.1 \leq d \leq 0.4$, $1.1 \leq [a+b+c+e] \leq 1.4$, and z is the number of oxygen satisfying the valence). At this time, the step of coating a metal oxide on the surface of the solid-solution active material can include a step of mixing the solid-solution active material with a solution of a salt of the metal element constituting the coating layer (a nitrate (aluminum nitrate of a salt of aluminum or the like), a carbonate (zirconium ammonium carbonate of a carbonate of zirconium), a metal alkoxide (tetraisopropoxytitanium of a metal alkoxide of titanium or the like), or the like) at a pH of from 7 to 8, a step of drying the solid-solution active material precursor obtained, and a step of calcining the solid-solution active material precursor obtained after drying at a temperature of 450° C.±50° C. The coating layer to be formed on a part or the whole of the particle surface of the solid-solution active material through these steps is desired to exhibit high Li ion mobility and further a high effect of suppressing elution of the transition metal. Furthermore, the coating layer can be present on a part or the whole (20 to 100%) of the surface of the particles of the solid-solution active material as the precipitation reaction of a hydroxide of a metal is conducted in a pH range of from 7 to 8 and the temperature for calcination is set to 450° C.±50° C. and preferably from 420° C. to 480° C. In addition, it is possible to produce a solid-solution active material in which a metal element is penetrated in the surface layer of the solid-solution active material particles. As a result, it is possible to provide a battery exhibiting excellent performance and durability. Hereinafter, each step will be described by taking a case in which the coating layer is formed of alumina as an example.

First, a solid-solution active material and an aluminum nitrate solution are mixed together at a pH of from 7 to 8. A solid-solution active material precursor can be thus obtained.

Aluminum nitrate is preferable as a raw material for aluminum. This is because the nitrate radical can be decomposed and removed in the calcination step and the performance of the battery using this positive electrode active material is thus favorable. In the case of aluminum sulfate or aluminum chloride, the sulfate radical and the chlorine radical remain and the performance of the battery using this positive electrode active material thus deteriorates. Incidentally, aluminum acetate is not suitable for the present method (precipitation reaction).

The blending amount of aluminum nitrate of a raw material for aluminum ($Al_2O_3$ layer) may be appropriately adjusted so as to be the content of $Al_2O_3$ in the positive electrode active material described above.

In the present step, a precipitating agent is further used. Ammonium water is suitable as the precipitating agent. This is because the ammonium radical can be decomposed and removed in the calcination step and the performance of the battery using this positive electrode active material is thus favorable. In the case of sodium hydroxide, Na remains as an impurity in the positive electrode active material and the performance of the battery using this positive electrode active material thus deteriorates.

When the pH at the time of mixing the solid-solution active material, the aluminum nitrate solution, and the ammonium water of the precipitating agent is lower than 7, the reaction between aluminum nitrate and ammonium water insufficiently proceeds, the precipitation of aluminum hydroxide poorly occurs, and it is thus impossible to obtain a desired coating amount with respect to the charged amount. On the other hand, when the pH is higher than 8, the aluminum hydroxide redissolves and it is thus impossible to obtain a desired coating amount with respect to the charged amount.

The mixing temperature and mixing time are not particularly limited as long as the reaction between aluminum nitrate and ammonium water sufficiently proceeds by the mixing operation and a desired solid-solution active material precursor (one in which aluminum hydroxide is precipitated on the surface of the solid-solution active material) is formed. As a guide, the mixing temperature (solution temperature of the reaction system) may be in a range of from 20 to 50° C. and the mixing time may be in a range of from 30 minutes to 3 hours. Incidentally, the solid-solution active material precursor thus obtained may be immersed in the solution as long as it is for about 3 hours after mixing. This makes it possible to coat a suitable alumina layer and to obtain an effect of improving charge and discharge characteristics and cycle durability. In addition, the mixing means (apparatus) is not particularly limited, and a conventionally known mixing and stirring means (apparatus) can be used.

Subsequently, the solid-solution active material precursor obtained above is dried. First, the solid-solution active material precursor is filtered from the above mixed solution. The filtration means (apparatus) is not particularly limited, and a conventionally known filtration means (apparatus) can be used.

Next, the solid-solution active material precursor thus filtered is dried. The drying conditions are not particularly limited as long as the solid-solution active material precursor can be sufficiently dried. That is, in the case of continuously conducting from drying to calcination, the drying step and the calcination step may not be strictly distinguished from each other, and from drying to calcination may be conducted at a predetermined temperature for calcination. From the facts described above, as the drying conditions, the drying temperature may be in a range of from 80 to 200° C. and the drying time may be in a range of from 30 minutes to 12 hours and preferably from 1 to 6 hours. In addition, the atmosphere at the time of drying is not particularly limited, and drying can be conducted in the air atmosphere or the like. In addition, the drying means (apparatus) is not particularly limited, and a conventionally known drying means (apparatus) can be used. Specifically, for example, vacuum drying, hot air drying, infrared (IR) drying, and natural drying can be appropriately used in combination.

Furthermore, the solid-solution active material precursor dried above is calcined at a temperature of 450° C.±50° C. The $Al_2O_3$ layer is present on a part or the whole of the surface of the particles of the solid-solution active material by setting the temperature for calcination to be in a range of 450° C.±50° C. and preferably from 420° C. to 480° C. and the time for calcination to be in a range of from 1 to 12 hours and preferably from 2 to 6 hours as the conditions for calcination of the solid-solution active material precursor. In addition, it is possible to produce a solid-solution active material in which an Al element is penetrated in the surface layer of the solid-solution active material particles. When the temperature for calcination is lower than 400° C., the decomposition of aluminum hydroxide is insufficient, a desired $Al_2O_3$ coating layer cannot be formed, and the battery using this positive electrode active material thus exhibits poor durability. On the other hand, when the temperature for calcination exceeds 500° C., the $Al_2O_3$ layer is dense, the Li ion mobility decreases, and the battery using this positive electrode active material thus exhibits poor performance. In addition, the atmosphere at the time of calcination is not particularly limited, and the calcination can be conducted in the air atmosphere or the like. In addition, the calcination means (apparatus) is not particularly limited, and a conventionally known calcination means (apparatus) can be used.

Depending on the cases, a positive electrode active material other than the solid-solution positive electrode active material described above may be used concurrently. In this case, a composite oxide of lithium with a transition metal is preferably concurrently used as a positive electrode active material from the viewpoint of capacity and output characteristics. It is a matter of course that other positive electrode active materials may be used. In a case in which the optimum particle diameters for exerting the inherent effects of the respective active materials are different from one another, the active materials having optimum particle diameters for exerting their inherent effects may be blended together and used, and it is not required to necessarily equalize the particle diameters of all the active materials.

The average particle diameter of the positive electrode active material contained in the positive electrode active material layer 15 is not particularly limited, but it is preferably from 1 to 30 μm and more preferably from 5 to 20 μm from the viewpoint of increasing the output. Incidentally, in the present specification, the term "particle diameter" means the longest distance among the distances between arbitrary two points on the contour line of the active material particle (observation plane) to be observed by using an observation means such as a scanning electron microscope (SEM) or a transmission electron microscope (TEM). In addition, in the present specification, as the value of "average particle diameter", a value calculated as an average value of the particle diameters of particles to be observed in several to several tens of visual fields by using an observation means such as a scanning electron microscope (SEM) or a transmission electron microscope (TEM) is adopted. The particle diameter and average particle diameter of other constituent components can also be defined in the same manner.

As described above, the positive electrode active material layer contains a positive electrode active material (solid-solution positive electrode active material) represented by the following Formula (2).

[Mathematical Formula 5]

$$e \text{ (Solid-solution positive electrode active material)} \quad (2)$$

In Formula (2) above, e represents the percent by weight of each component in the positive electrode active material layer and $80 \leq e \leq 98$.

As is apparent from Formula (2), the content of the solid-solution positive electrode active material in the positive electrode active material layer is essentially from 80 to 98% by mass and preferably from 84 to 98% by mass.

In addition, it is preferable that the positive electrode active material layer contains a binder and an electric conductive auxiliary in addition to the solid-solution positive electrode active material described above. Furthermore, the positive electrode active material layer further contains other additives such as an electrolyte (a polymer matrix, an ion conductive polymer, an electrolytic solution, or the like) and a lithium salt for enhancing the ion conductivity if necessary.

(Binder)

The binder to be used in the positive electrode active material layer is not particularly limited, but examples thereof may include the following materials. Thermoplastic polymers such as polyethylene, polypropylene, polyethylene terephthalate (PET), polyether nitrile (PEN), polyacrylonitrile, polyimide, polyamide, polyamide-imide, cellulose, carboxymethyl cellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and any hydrogenated product thereof, and a styrene-isoprene-styrene block copolymer and any hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), and an epoxy resin. These binders can be used singly or two or more kinds thereof can be used concurrently.

The content of the binder in the positive electrode active material layer is preferably from 1 to 10% by weight and more preferably from 1 to 8% by weight.

(Electric Conductive Auxiliary)

The electric conductive auxiliary is an additive to be blended in order to improve the electric conductivity of the positive electrode active material layer or the negative electrode active material layer. Examples of the electric conductive auxiliary may include carbon black such as Ketjen black and acetylene black. An electronic network which can contribute to improvement of output characteristics of the battery is effectively formed in the interior of the active material layer when the active material layer contains an electric conductive auxiliary.

The content of the electric conductive auxiliary in the positive electrode active material layer is preferably from 1 to 10% by mass and more preferably from 1 to 8% by mass. The following effects are exerted by regulating the blending ratio (content) of the electric conductive auxiliary to be in the above range. That is, it is possible to sufficiently ensure the electron conductivity without hindering the electrode reaction, to suppress a decrease in energy density due to a decrease in electrode density, and thus to attain the improvement in energy density due to the improvement in electrode density.

(Other Components)

Examples of the electrolyte salt (lithium salt) may include Li(C$_2$F$_5$SO$_2$)$_2$N, LiPF$_6$, LiBF$_4$, LiClO$_4$, LiAsF$_6$, and LiCF$_3$SO$_3$.

Examples of the ion conductive polymer may include a polyethylene oxide-based (PEO) polymer and a polypropylene oxide-based (PPO) polymer.

The positive electrode (positive electrode active material layer) can be formed by any method of a kneading method, a sputtering method, a vapor deposition method, a CVD method, a PVD method, an ion plating method, or a thermal spraying method in addition to an ordinary method to coat a slurry.

[Negative Electrode Active Material Layer]

The negative electrode active material layer 13 contains silicon-containing alloy as a negative electrode active material.

(Silicon-Containing Alloy)

In the present embodiment, a silicon-containing alloy as the negative electrode active material has a predetermined structure in which a silicide phase containing a silicide of a transition metal is dispersed in a parent phase containing amorphous or low crystalline silicon as a main component and has a predetermined composition.

As described above, the silicon-containing alloy constituting the negative electrode active material in the present embodiment contains a parent phase containing amorphous or low crystalline silicon as a main component. Thus, an electric device which has a high capacity and exhibits excellent cycle durability can be provided when silicon constituting the parent phase is amorphous or low crystalline.

The parent phase constituting the silicon-containing alloy is a phase containing silicon as a main component, and it is preferably a Si single phase (a phase composed only of Si). This parent phase (a phase containing Si as a main component) is a phase involved in occlusion and release of lithium ions at the time of operation of the electric device (lithium ion secondary battery) of the present embodiment, and it is a phase capable of electrochemically reacting with Li. In a case of a Si single phase, it is possible to occlude and release a large amount of Li per unit weight and per unit volume. However, Si exhibits poor electron conductivity, and the parent phase may thus contain trace amounts of additive elements such as phosphorus and boron, transition metals, and the like. Incidentally, it is preferable that this parent phase (a phase containing Si as a main component) is more amorphized than the silicide phase to be described later. By employing such a configuration, the negative electrode active material (silicon-containing alloy) can be formed to have a higher capacity. Incidentally, it is possible to confirm whether the parent phase is more amorphized than the silicide phase or not by electron diffraction analysis. Specifically, according to electron diffraction analysis, a net pattern (lattice-shaped spot) of a two-dimensional point array is obtained for a single crystal phase, the Debye-Scherrer ring (diffraction ring) is obtained for a polycrystalline phase, and a halo pattern is obtained for an amorphous phase. The above confirmation is possible by utilizing this.

Meanwhile, in addition to the parent phase, the silicon-containing alloy constituting the negative electrode active material in the present embodiment also contains a silicide phase which is dispersed in the parent phase and contains a silicide (also referred to as a silicide) of a transition metal. This silicide phase contains a silicide of a transition metal (for example, TiSi$_2$) so as to exhibit excellent affinity for the parent phase and to be able to suppress cracking at the crystal interface particularly due to volume expansion at the time of charge. Furthermore, the silicide phase is superior to the parent phase in electron conductivity and hardness. For this reason, the silicide phase improves low electron conductivity of the parent phase and also plays a role of maintaining the shape of the active material against the stress at the time of expansion.

A plurality of phases may be present in the silicide phase, and, for example, two or more phases (for example, MSi$_2$ and MSi) having different composition ratios of the transition metal element M to Si may be present. In addition, two or more phases may be present by containing silicides of different transition metal elements. Here, the kind of the transition metal contained in the silicide phase is not particularly limited, but it is preferably at least one kind selected from the group consisting of Ti, Zr, Ni, Cu, and Fe, more preferably Ti or Zr, and particularly preferably Ti. The silicides formed of these elements have higher electron conductivity than silicides of other elements and a high strength. In particular, TiSi$_2$ of a silicide in a case in which the transition metal element is Ti is preferable since it exhibits significantly excellent electron conductivity.

Particularly, in a case in which the transition metal element M is Ti and two or more phases (for example, TiSi$_2$ and TiSi) having different composition ratios are present in the silicide phase, a TiSi$_2$ phase is 50% by mass or more, preferably 80% by mass or more, more preferably 90% by mass or more, particularly preferably 95% by mass or more, and most preferably 100% by mass of the silicide phase.

The size of the silicide phase is not particularly limited, but the size of the silicide phase is 50 nm or less in a preferred embodiment. By employing such a configuration, the negative electrode active material (silicon-containing alloy) can be formed to have a higher capacity.

In the present invention, the silicon-containing alloy constituting the negative electrode active material has a composition represented by the following Chemical Formula (1).

[Chemical Formula 7]

$$Si_xSn_yM_zA_a \quad (1)$$

In Chemical Formula (1) above, A is an unavoidable impurity, M is one or two or more transition metal elements, x, y, z, and a represent values in terms of percent by mass, and $0<x<100$, $0 \leq y<100$, $0<z<100$, and $0 \leq a<0.5$ and $x+y+z+a=100$.

As it is apparent from Chemical Formula (1) above, the silicon-containing alloy according to a preferred embodiment of the present invention (having a composition of Si$_x$Sn$_y$M$_z$A$_a$) is a binary system (in the case of y=0) of Si and M (transition metal) or a ternary system (in the case of y>0) of Si, Sn, and M (transition metal). Between them, the silicon-containing alloy is more preferably a ternary system of Si, Sn and M (transition metal) from the viewpoint of cycle durability. In addition, in the present specification, the term "an unavoidable impurity" means a component that is present in the raw material or has been unavoidably mixed into the Si-containing alloy during the production process. The unavoidable impurity is not originally required, but it is in a trace amount and does not affect the characteristics of the Si alloy, and it is thus allowable impurity.

In the present embodiment, it is possible to suppress the phase transition between an amorphous state and a crystalline state at the time of alloying Si with Li and thus to improve the cycle lifespan particularly by selecting Ti as an additive element (M; a transition metal) to the negative electrode active material (silicon-containing alloy) and adding Sn as a second additive element if necessary. In addition, by this, a negative electrode active material is formed to have a higher capacity than a conventional negative electrode active material (for example, carbon-based negative electrode active material). Hence, according to a preferred embodiment of the present invention, it is preferable that M be titanium (Ti) in the composition represented by Chemical Formula (1) above. And it is more preferable that the composition represented by Chemical Formula (1) above be a ternary system of Si—Sn—Ti containing titanium as M.

Here, the reason for suppressing the phase transition between an amorphous state and a crystalline state at the time of alloying Si with Li is because transition from an amorphous state to a crystalline state occurs to cause a great change in volume (about fourfold) at the time of alloying Si with Li in a Si material and thus the particles themselves are broken and lose the function as an active material. Hence, by suppressing the phase transition between an amorphous state and a crystalline state, it is possible to suppress collapse of the particles themselves, to maintain the function (high capacity) as an active material, and also to improve the cycle lifespan. By selecting such an additive element, it is possible to provide a Si alloy negative electrode active material having a high capacity and high cycle durability.

In the composition of Chemical Formula (1) above, the composition ratio z of the transition metal M (particularly Ti) is preferably $7<z<100$, more preferably $10<z<100$, still more preferably $15<z<100$, and particularly preferably $20 \leq z<100$. By setting the composition ratio z of the transition metal M (particularly Ti) to be in such a range, the cycle characteristics can be even further improved.

More preferably, x, y, and z in Chemical Formula (1) satisfy the following Mathematical Formula (1) or (2).
[Mathematical Formula 6]

$$35 \leq x \leq 78, 7 \leq y \leq 30, 0<z \leq 37 \quad (1)$$

$$35 \leq x \leq 52, 30 \leq y \leq 51, 0<z \leq 35 \quad (2)$$

When the contents of the respective components are in the above ranges, an initial discharge capacity exceeding 1000 Ah/g can be obtained and the cycle lifespan can also exceed 90% (50 cycles).

Incidentally, it is desirable to set the content of the transition metal M (particularly Ti) to be in a range of more than 7% by mass from the viewpoint of attaining further improvement in characteristics of the negative electrode active material. In other words, it is preferable that x, y, and z satisfy the following Mathematical Formula (3) or (4).
[Mathematical Formula 7]

$$35 \leq x \leq 78, 7 \leq y \leq 30, 7<z \leq 37 \quad (3)$$

$$35 \leq x \leq 52, 30 \leq y \leq 51, 7<z \leq 35 \quad (4)$$

This makes it possible to even further improve the cycle characteristics.

Moreover, it is preferable that x, y, and z satisfy the following Mathematical Formula (5) or (6):
[Mathematical Formula 8]

$$\pm \leq x \leq 68, 7 \leq y \leq 30, 18 \leq z \leq 37 \quad (5)$$

$$35 \leq x \leq 52, 30 \leq y \leq 51, 7<z \leq 20 \quad (6)$$

from the viewpoint of securing more favorable cycle durability.

Moreover, it is preferable that x, y, and z satisfy the following Mathematical Formula (7):
[Mathematical Formula 9]

$$46 \leq x \leq 58, 7 \leq y \leq 21, 24 \leq z \leq 37 \quad (7)$$

in the negative electrode active material of the present embodiment from the viewpoints of initial discharge capacity and cycle durability.

Incidentally, as described above, A is an impurity (an unavoidable impurity) other than the three components described above, which is derived from raw materials and the production method. a is $0 \leq a<0.5$ and preferably $0 \leq a<0.1$.

The silicon-containing alloy constituting the negative electrode active material in the present embodiment is characterized in that the ratio value (B/A) of a diffraction peak intensity B of silicide of a transition metal in a range of $2\theta=37$ to $45°$ to a diffraction peak intensity A of a (111) plane of Si in a range of $2\theta=24$ to $33°$ is 0.41 or more in an X-ray diffraction measurement of the silicon-containing alloy using a CuKα1 ray. This ratio value (B/A) is preferably 0.89 or more, more preferably 2.55 or more, and particularly preferably 7.07 or more. In the present application, the X-ray diffraction analysis for calculating the above ratio value of diffraction peaks is conducted by using the method described in the section for Examples to be described later.

Figure 3A:
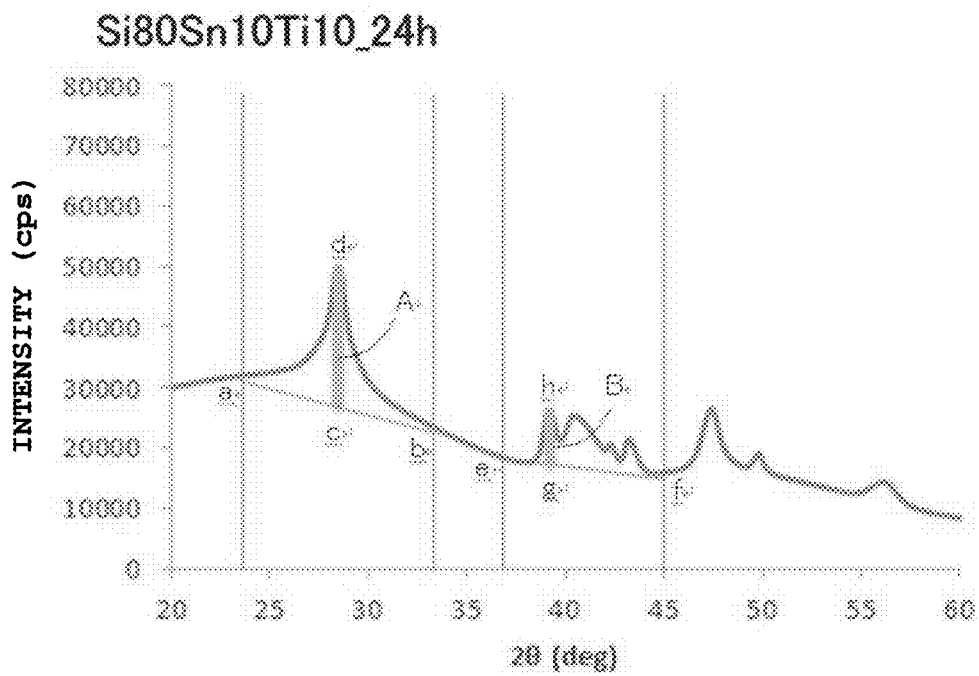
FIG. 3A illustrates a diffraction spectrum of a Si-containing alloy (negative electrode active material) powder used in a negative electrode A1 fabricated in Examples obtained by X-ray diffraction analysis.
Figure 3B:
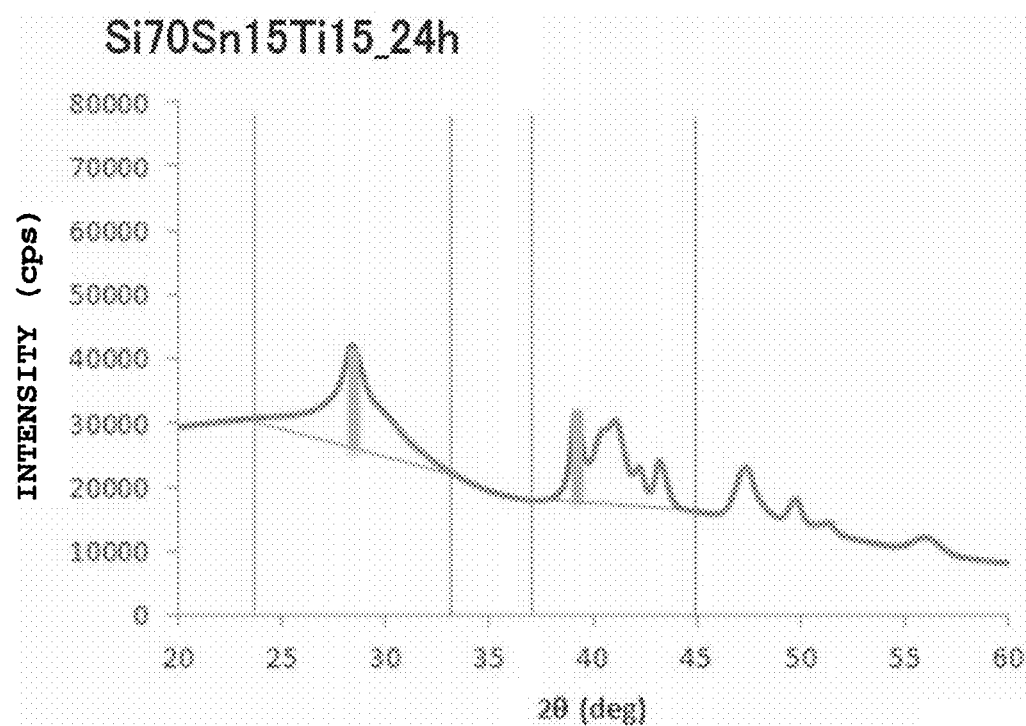
FIG. 3B illustrates a diffraction spectrum of a Si-containing alloy (negative electrode active material) powder used in a negative electrode A2 fabricated in Examples obtained by X-ray diffraction analysis.
Figure 3C:
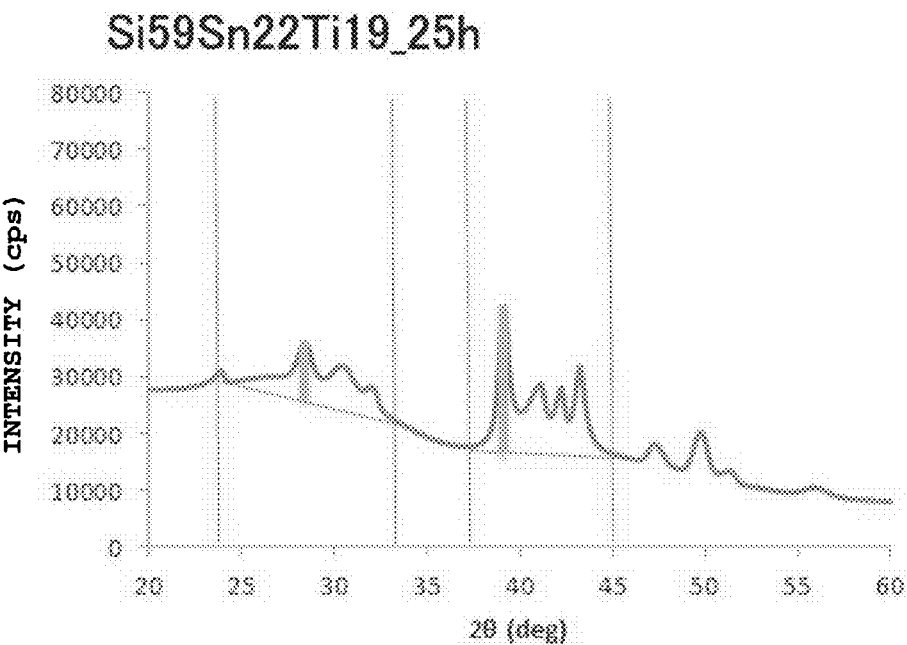
FIG. 3C illustrates a diffraction spectrum of a Si-containing alloy (negative electrode active material) powder used in a negative electrode A3 fabricated in Examples obtained by X-ray diffraction analysis.
Figure 3D:
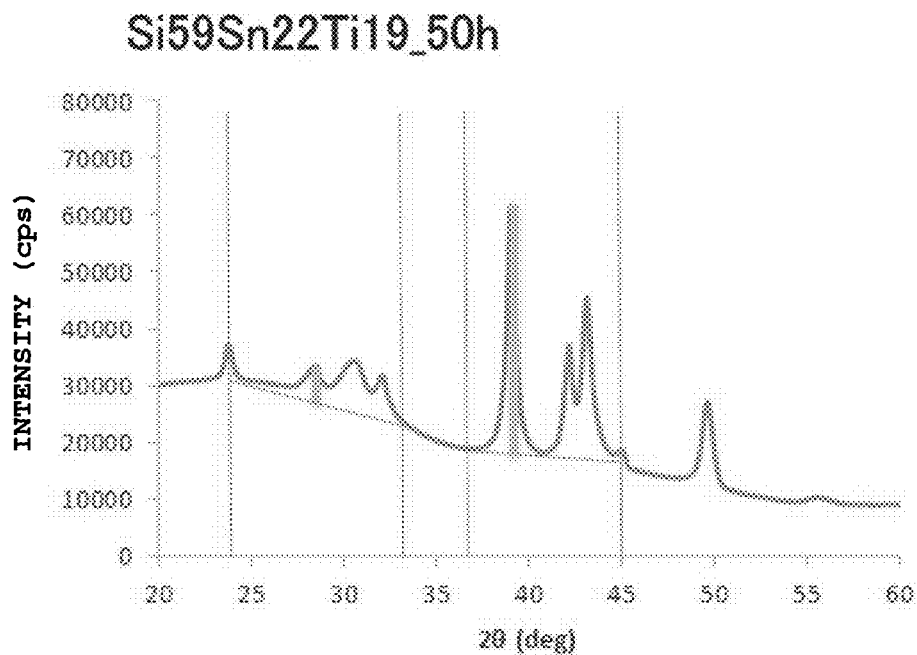
FIG. 3D illustrates a diffraction spectrum of a Si-containing alloy (negative electrode active material) powder used in a negative electrode A4 fabricated in Examples obtained by X-ray diffraction analysis.
Figure 3E:
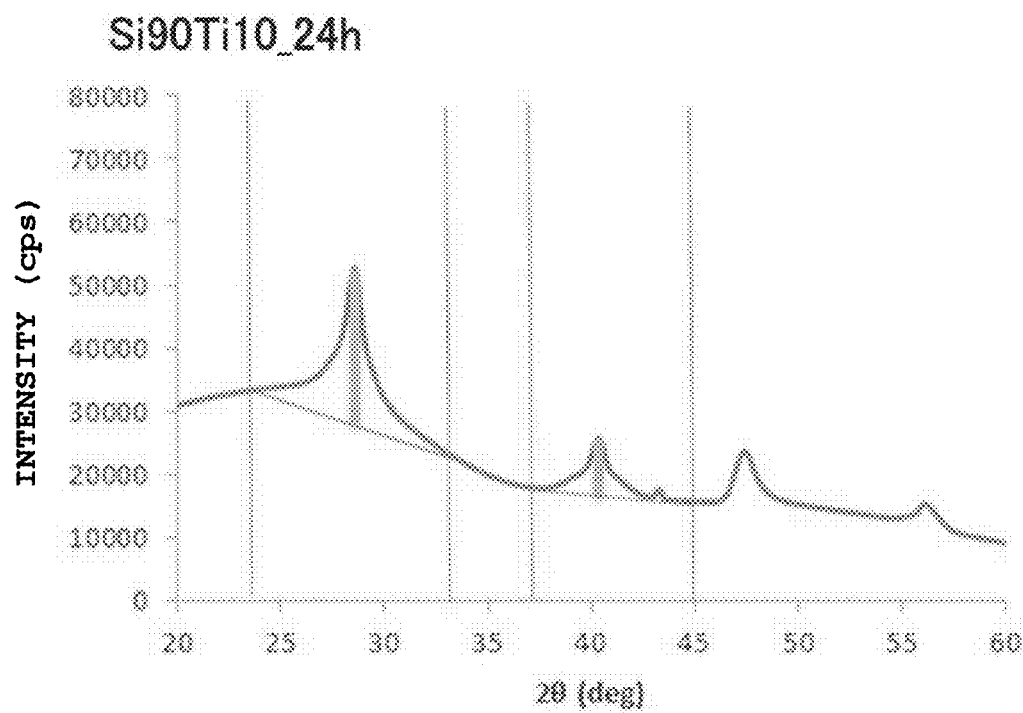
FIG. 3E illustrates a diffraction spectrum of a Si-containing alloy (negative electrode active material) powder used in a negative electrode A5 fabricated in Examples obtained by X-ray diffraction analysis.

Here, the diffraction peak intensity A of the (111) plane of Si in a range of $2\theta=24$ to $33°$ can be determined as follows (see FIG. 3A corresponding to the result of negative electrode prepared in Example to be described later).

First, in the diffraction spectrum obtained by X-ray diffraction analysis, the point at which a perpendicular line at $2\theta=24°$ intersects with the diffraction spectrum is taken as a. In the same manner, the point at which a perpendicular line at $2\theta=33°$ intersects with the X-ray diffraction spectrum is taken as b. Here, a line segment ab is taken as the base line, and the point at which a perpendicular line at the diffraction peak ($2\theta=$about $28.5°$) of the (111) plane of Si intersects with the base line is taken as c. Thereafter, the diffraction peak intensity A of the (111) plane of Si can be determined as the length of a line segment cd connecting a vertex d of the diffraction peak ($2\theta=$about $28.5°$) of the (111) plane of Si and the point c.

In the same manner as the above, the diffraction peak intensity B of silicide of a transition metal in a range of $2\theta=37$ to $45°$ can also be determined. Hereinafter, the case in which a silicide of a transition metal is $TiSi_2$ will be described as an example.

First, in the diffraction spectrum obtained by X-ray diffraction analysis, the point at which a perpendicular line at $2\theta=37°$ intersects with the diffraction spectrum is taken as e. In the same manner, the point at which a perpendicular line at $2\theta=45°$ intersects with the X-ray diffraction spectrum is taken as f. Here, a line segment of is taken as the base line, and the point at which a perpendicular line of the diffraction peak ($2\theta=$about $39°$) of $TiSi_2$ intersects with the base line is taken as g. Thereafter, the diffraction peak intensity B of $TiSi_2$ can be determined as the length of a line segment gh connecting a vertex h of the diffraction peak ($2\theta=$about $39°$) of $TiSi_2$ and the point g.

Here, the specific value of each of the diffraction peak intensity A of the (111) plane of Si and the diffraction peak intensity B of a silicide of a transition metal is not particularly limited, but the diffraction peak intensity A of the (111) plane of Si is preferably from 6000 to 25000 (cps) and more preferably from 6000 to 15000. In addition, the diffraction peak intensity B of a silicide of a transition metal is preferably from 9000 to 46000 (cps) and more preferably from 25000 to 46000 (cps). There is an advantage of being easy to reliably achieve the intensity ratio (B/A) of diffraction peaks described above when A and B are controlled to have values in these ranges.

The particle diameter of the silicon-containing alloy constituting the negative electrode active material in the present embodiment is not particularly limited, but the average particle diameter is preferably from 0.1 to 20 μm and more preferably from 0.2 to 10 μm.

(Method of Producing Negative Electrode Active Material)

The method of producing the negative electrode active material (silicon-containing alloy) according to the present embodiment is not particularly limited, and conventionally known knowledge can be appropriately referred to, but in the present application, as an example of a production method for setting the value of the intensity ratio B/A of diffraction peaks obtained by X-ray diffraction analysis to be in the range as described above, a production method including the following steps is provided.

First, a step of mixing raw materials of the silicon-containing alloy to obtain a mixed powder is carried out. In this step, the raw materials of the alloy are mixed in consideration of the composition of the negative electrode active material (silicon-containing alloy) to be obtained. As the raw materials of the alloy, the form and the like thereof are not particularly limited as long as the ratio of elements required as a negative electrode active material can be realized. For example, it is possible to use one obtained by mixing simple substances of elements constituting the negative electrode active material at the intended ratio or an alloy, a solid solution, or an intermetallic compound having the intended element ratio. In addition, raw materials in a powder form are usually mixed. By this, a mixed powder composed of raw materials is obtained. Incidentally, it is possible to control the above intensity ratio (B/A) by adjusting the composition ratio of silicon (Si) and titanium (Ti). For example, it is possible to increase the intensity ratio (B/A) by increasing the composition ratio of Ti to Si.

Subsequently, the mixed powder obtained above is subjected to an alloying treatment. By this, a silicon-containing alloy that can be used as a negative electrode active material for electric device is obtained.

As a method of alloying treatment, there are a solid phase method, a liquid phase method, and a vapor phase method, but examples thereof may include a mechanical alloying method, an arc plasma melting method, a casting method, a gas atomizing method, a liquid quenching method, an ion beam sputtering method, a vacuum deposition method, a plating method, and a vapor phase chemical reaction method. Among them, it is preferable to conduct the alloying treatment by using the mechanical alloying method. It is preferable to conduct the alloying treatment by using the mechanical alloying method since it is possible to easily control the state of the phase. In addition, a step of melting the raw materials or a step of quenching and solidifying the molten material thus molten may be included before the alloying treatment.

In the production method according to the present embodiment, the alloying treatment described above is conducted. This makes it possible to have a structure composed of the parent phase and the silicide phase as described above. It is possible to obtain a negative electrode active material (silicon-containing alloy) capable of exerting desired cycle durability particularly when the time for the alloying treatment (preferably by the mechanical alloying method) is 24 hours or longer. Incidentally, the time for the alloying treatment is preferably 30 hours or longer, more preferably 36 hours or longer, still more preferably 42 hours or longer, and particularly preferably 48 hours or longer. As described above, also by increasing the time for the alloying treatment, the intensity ratio (B/A) of the diffraction peak can be increased. Incidentally, the upper limit value of the time for the alloying treatment is not particularly set, but it may be usually 72 hours or shorter.

The alloying treatment by the method described above is usually conducted in a dry atmosphere, but the particle size distribution after the alloying treatment has a wide width from a small size to a large size in some cases. For this reason, it is preferable to conduct a crushing treatment and/or classification treatment to adjust the particle size.

The predetermined alloy to be essentially contained in the negative electrode active material layer has been described above, but the negative electrode active material layer may contain other negative electrode active materials. Examples of the negative electrode active material other than the predetermined alloy may include carbon such as natural graphite, artificial graphite, carbon black, activated carbon, carbon fiber, coke, soft carbon, and hard carbon, a pure metal such as Si or Sn, or an alloy-based active material having a composition ratio which deviates from the predetermined composition ratio described above, or a metal oxide such as TiO, $Ti_2O_3$, or $TiO_2$ or $SiO_2$, SiO, or $SnO_2$, a composite oxide (a composite nitride) of lithium and a transition metal such as $Li_{4/3}Ti_{5/3}O_4$ or $Li_7MnN$, Li—Pb alloy, Li—Al alloy, or Li. However, from the viewpoint of sufficiently exerting the action and effect obtained by using the predetermined alloy as the negative electrode active material, the content of the predetermined alloy in 100% by mass of the total amount of the negative electrode active material is preferably from 50 to 100% by mass, more preferably from 80 to 100% by mass, still more preferably from 90 to 100% by mass, particularly preferably from 95 to 100% by mass, and most preferably 100% by mass.

The negative electrode active material layer contains a negative electrode active material represented by the following Formula (1).

[Mathematical Formula 10]

$$\alpha(\text{Si-containing alloy}) \quad (1)$$

In Formula (1) above, α represents the percent by weight of each component in the negative electrode active material layer and $40<\alpha\leq98$.

As is apparent from Formula (1), the content of the negative electrode active material composed of the Si-containing alloy in the negative electrode active material layer is more than 40% by mass and 98% by mass or less.

In the present embodiment, it is preferable that the negative electrode active material layer contains a binder and an electric conductive auxiliary in addition to the negative electrode active material described above. In addition, the negative electrode active material layer further contains other additives such as an electrolyte (a polymer matrix, an ion conductive polymer, an electrolytic solution, or the like) and a lithium salt for enhancing the ion conductivity if necessary. With regard to the specific kind of these and preferred content of these in the negative electrode active material layer, the forms described in the section for description of the positive electrode active material layer can be employed in the same manner, and the detailed description thereon will be omitted here.

The thickness of each active material layer (the active material layer on one side of the current collector) is also not particularly limited, and conventionally known knowledge on batteries can be appropriately referred to. As an example, the thickness of each active material layer is usually about from 1 to 500 μm and preferably from 2 to 100 μm in consideration of the intended use (output-oriented, energy-oriented, or the like) of the battery and ion conductivity.

<Current Collector>

The current collectors 11 and 12 are composed of an electric conductive material. The size of the current collector is determined according to the application of the battery. For example, a current collector having a large area is used when the current collector is used in a large battery requiring a high-energy density.

The thickness of the current collector is also not particularly limited. The thickness of the current collector is usually about from 1 to 100 μm.

The shape of the current collector is also not particularly limited. In the stacked type battery 10 illustrated in FIG. 1, a mesh shape (expanded grid or the like) or the like can be used in addition to the current collector foil.

Incidentally, it is desirable to use a current collecting foil in the case of directly forming a thin film alloy of the negative electrode active material on the negative electrode current collector 11 by a sputtering method or the like.

The material constituting the current collector is not particularly limited. For example, a metal or a resin in which an electric conductive filler is added to an electric conductive polymer material or an electric nonconductive polymer material can be employed.

Specifically, examples of the metal may include aluminum, nickel, iron, stainless steel, titanium, and copper. In addition to these, a clad material of nickel with aluminum, a clad material of copper with aluminum, a plated material of a combination of these metals, or the like can be preferably used. In addition, it may be a foil fabricated by covering aluminum on a metal surface. Among them, aluminum, stainless steel, copper, and nickel are preferable from the viewpoints of electron conductivity, action potential of battery, adhesive property of the negative electrode active material to the current collector by sputtering, and the like.

In addition, examples of the electric conductive polymer material may include polyaniline, polypyrrole, polythiophene, polyacetylene, polyparaphenylene, polyphenylenevinylene, polyacrylonitrile, and polyoxadiazole. Since such an electric conductive polymer material exhibits sufficient electric conductivity even without adding an electric conductive filler thereto and it is thus advantageous from the viewpoint of facilitating the production process or decreasing the weight of the current collector.

Examples of the electric nonconductive polymer material may include polyethylene (PE; high density polyethylene (HDPE), low density polyethylene (LDPE), and the like), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), or polystyrene (PS). Such an electric nonconductive polymer material can exhibit excellent electric potential resistance or solvent resistance.

An electric conductive filler may be added to the electric conductive polymer material or electric nonconductive polymer material described above if necessary. An electric conductive filler is necessarily essential in order to impart electric conductivity to the resin particularly in a case in which the resin to be the base material of the current collector is composed only of an electric nonconductive polymer.

The electric conductive filler can be used without being particularly limited as long as it is a substance exhibiting electric conductivity. Examples of a material exhibiting excellent electric conductivity, electric potential resistance, or lithium ion shielding property may include metal and electric conductive carbon. The metal is not particularly limited, but it is preferable to contain at least one kind of metal selected from the group consisting of Ni, Ti, Al, Cu, Pt, Fe, Cr, Sn, Zn, In, Sb, and K or an alloy or metal oxide containing these metals. In addition, the electric conductive carbon is not particularly limited. It is preferably one that contains at least one kind selected from the group consisting of acetylene black, vulcan, black pearl, carbon nanofiber, Ketjen black, carbon nanotube, carbon nanohorn, carbon nanoballoon, and fullerene.

The amount of the electric conductive filler added is not particularly limited as long as it is an amount in which sufficient electric conductivity can be imparted to the current collector, and it is generally about from 5 to 35% by mass.

<Separator (Electrolyte Layer)>

The separator has a function to secure the lithium ion conductivity between the positive electrode and the negative electrode by retaining the electrolyte and a function as a partition wall between the positive electrode and the negative electrode.

Examples of the form of separator may include a porous sheet separator formed of a polymer or fiber which absorbs and retains the electrolyte or a nonwoven fabric separator.

As a porous sheet separator formed of a polymer or fiber, for example, a microporous (microporous membrane) separator can be used. Examples of a specific form of the porous sheet formed of a polymer or fiber may include a microporous (microporous membrane) separator formed of a polyolefin such as polyethylene (PE) or polypropylene (PP); a laminate formed by laminating a plurality of these (for example, a laminate having a three-layer structure of PP/PE/PP), a hydrocarbon-based resin such as polyimide, aramid, or polyvinylidene fluoride-hexafluoropropylene (PVdF-HFP), or a glass fiber.

The thickness of the microporous (microporous membrane) separator varies depending on the intended application, and it cannot be thus unambiguously regulated. As an example, the thickness is desirably from 4 to 60 μm in a single layer or multiple layers in applications such as a secondary battery for driving motors of an electric vehicle (EV), a hybrid electric vehicle (HEV), a fuel cell vehicle (FCV), and the like. The micropore diameter of the microporous (microporous membrane) separator is desirably 1 μm or less maximum (usually a pore diameter of about several tens nm).

As the nonwoven fabric separator, those that are conventionally known such as cotton, rayon, acetate, nylon, polyester; polyolefins such as PP and PE; and polyimide and aramid are used singly or in mixture thereof. In addition, the bulk density of the nonwoven fabric is not particularly limited as long as sufficient battery characteristics can be obtained by the impregnated polymer gel electrolyte. Furthermore, the thickness of the nonwoven fabric separator may be the same as that of the electrolyte layer, and it is preferably from 5 to 200 μm and particularly preferably from 10 to 100 μm.

In addition, the separator contains an electrolyte as described above. The electrolyte is not particularly limited as long as it can exert such a function, but a liquid electrolyte or a gel polymer electrolyte is used. By using the gel polymer electrolyte, the stabilization of distance between the electrodes is attained, the occurrence of polarization is suppressed, and the durability (cycle characteristics) is improved.

The liquid electrolyte has a function as a carrier of lithium ions. The liquid electrolyte constituting the electrolytic solution layer has a form in which a lithium salt of a supporting salt is dissolved in an organic solvent of a plasticizer. Examples of the organic solvent may include carbonates such as ethylene carbonate (EC), propylene carbonate (PC), dimethyl carbonate (DMC), diethyl carbonate (DEC), and ethyl methyl carbonate. As the lithium salt, it is possible to employ a compound that can be added to the active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, or $LiCF_3SO_3$. The liquid electrolyte may further contain additives other than the components described above. Specific examples of such compounds may include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methyleneethylene carbonate, and 1,1-dimethyl-2-methyleneethylene carbonate. Among these, vinylene carbonate, methyl vinylene carbonate, and vinylethylene carbonate are preferable, and vinylene carbonate and vinylethylene carbonate are more preferable. Only one kind of these cyclic carbonic acid esters may be used singly or two or more kinds thereof may be concurrently used.

The gel polymer electrolyte has a configuration in which the liquid electrolyte is injected into a matrix polymer composed of an ion conductive polymer (host polymer). It is excellent to use a gel polymer electrolyte as the electrolyte from the viewpoint that the fluidity of the electrolyte is eliminated and ionic conduction between the respective layers is easily shielded. Examples of the ion conductive polymer to be used as the matrix polymer (host polymer) may include polyethylene oxide (PEO), polypropylene oxide (PPO), polyethylene glycol (PEG), polyacrylonitrile (PAN), polyvinylidene fluoride-hexafluoropropylene (PVdF-HEP), polymethyl methacrylate (PMMA) and a copolymer thereof.

A matrix polymer of the gel electrolyte can exert excellent mechanical strength by forming a crosslinked structure. In order to form a crosslinked structure, a polymerizable polymer (for example, PEO or PPO) for forming a polymer electrolyte may be subjected to a polymerization treatment such as heat polymerization, ultraviolet polymerization, radiation polymerization, or electron beam polymerization using a proper polymerization initiator.

In addition, the separator is preferably a separator (a separator with heat resistant insulating layer) in which a heat resistant insulating layer is layered on a porous substrate. The heat resistant insulating layer is a ceramic layer containing inorganic particles and a binder. As the separator with heat resistant insulating layer, one that has a melting point or thermal softening point of 150° C. or higher and preferably 200° C. or higher and thus exhibits high heat resistance. By having a heat resistant insulating layer, the internal stress of the separator which increases when the temperature increases is alleviated and an effect of suppressing thermal contraction can be thus obtained. As a result, it is possible to prevent induction of a short circuit between the electrodes of the battery and thus to have a battery configuration in which a decrease in performance due to an increase in temperature hardly occurs. In addition, by having a heat resistant insulating layer, the mechanical strength of the separator with heat resistant insulating layer is improved and rupture of the membranes of the separator hardly occurs. Furthermore, the separator hardly curls in the production process of the battery because of the effect of suppressing thermal contraction and a high mechanical strength.

The inorganic particles in the heat resistant insulating layer contribute to the mechanical strength of the heat resistant insulating layer and the effect of suppressing thermal contraction. The material to be used as the inorganic particles is not particularly limited. Examples thereof may include oxides ($SiO_2$, $Al_2O_3$, $ZrO_2$, and $TiO_2$), hydroxides, and nitrides of silicon, aluminum, zirconium, and titanium, and composites thereof. These inorganic particles may be those derived from mineral resources such as boehmite, zeolite, apatite, kaolin, mullite, spinel, olivine, and mica or those artificially produced. In addition, only one kind of these inorganic particles may be used singly, or two or more kinds thereof may be used concurrently. Among these, from the viewpoint of cost, it is preferable to use silica ($SiO_2$) or alumina ($Al_2O_3$) and it is more preferable to use alumina ($Al_2O_3$).

The basis weight of the heat resistant particles is not particularly limited, but it is preferably from 5 to 15 g/m$^2$. It is preferable that the basis weight is in this range from the viewpoint of obtaining sufficient ionic conductivity and maintaining a heat resistant strength.

The binder in the heat resistant insulating layer plays a role of binding the inorganic particles with each other or the inorganic particles with the resin porous substrate layer. By the binder, the heat resistant insulating layer is stably formed and peeling off between the porous substrate layer and the heat resistant insulating layer is prevented.

The binder to be used in the heat resistant insulating layer is not particularly limited, and for example, a compound such as carboxymethylcellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), or methyl acrylate can be used as the binder. Among these, it is preferable to use carboxymethyl cellulose (CMC), methyl acrylate, or polyvinylidene fluoride (PVDF). Only one kind of these compounds may be used singly, or two or more kinds thereof may be used concurrently.

The content of the binder in the heat resistant insulating layer is preferably from 2 to 20% by weight with respect to 100% by weight of the heat resistant insulating layer. It is possible to increase the peel strength between the heat resistant insulating layer and the porous substrate layer and to improve the vibration resistance of the separator when the content of the binder is 2% by weight or more. Meanwhile, the gaps between the inorganic particles are adequately kept when the content of the binder is 20% by weight or less, and sufficient lithium ion conductivity can be thus secured.

The thermal contraction rate of the separator with heat resistant insulating layer is preferably 10% or less in both MD and TD after the separator is retained for 1 hour under the conditions of 150° C. and 2 gf/cm². By using such a material exhibiting high heat resistance, it is possible to effectively prevent contraction of the separator even when the quantity of heat generated at the positive electrode increases and the internal temperature of the battery thus reaches 150° C. As a result, it is possible to prevent induction of a short circuit between the electrodes of the battery and thus to have a battery configuration in which a decrease in performance due to an increase in temperature hardly occurs.

<Current Collecting Plate (Tab)>

In a lithium ion secondary batter, for the purpose of taking out the electric current to the outside of the battery, the current collecting plate which is electrically connected to the current collector is brought out to the outside of the laminate sheet of the battery outer packaging material.

The material constituting the current collecting plate is not particularly limited and a known highly electric conductive material which is conventionally used as a current collecting plate for lithium ion secondary battery can be used. As the material constituting the current collecting plate, for example, metal materials such as aluminum, copper, titanium, nickel, stainless steel (SUS), and any alloy thereof are preferable. From the viewpoint of light weight, corrosion resistance, and high electric conductivity, aluminum and copper are more preferable and aluminum is particularly preferable. Incidentally, the same material or different materials may be used in the positive electrode current collecting plate (positive electrode tab) and the negative electrode current collecting plate (negative electrode tab).

Figure 2:
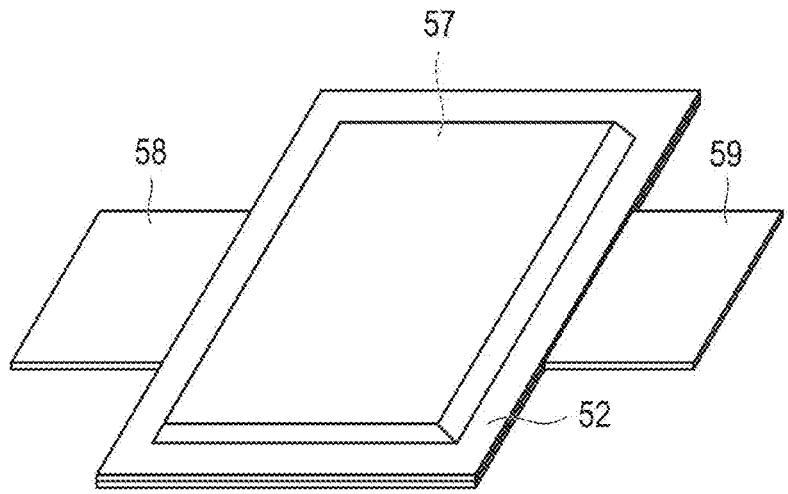
FIG. 2 is a perspective view which illustrates the outline of a flat lithium ion secondary battery of a representative embodiment of an electric device according to the present invention.

In addition, bringing out of the tabs 58 and 59 illustrated in FIG. 2 are not also particularly limited. The positive electrode tab 58 and the negative electrode tab 59 may be pulled out from the same side or each of the positive electrode tab 58 and the negative electrode tab 59 may be divided into a plurality of pieces and brought out from each side, and the bringing out is not limited to that illustrated in FIG. 2. In addition, in a wound type lithium ion battery, terminals may be formed by utilizing, for example, a cylindrical can (metal can) instead of a tab.

<Seal Portion>

The seal portion is a member peculiar to the series stacked type battery and has a function to prevent leakage of the electrolyte layer. The seal portion can also prevent contact of adjacent current collectors with each other in the battery or occurrence of a short circuit due to a slight unevenness of the end portions of the stacked electrode in addition to this.

The constituent material for the seal portion is not particularly limited, but a polyolefin resin such as polyethylene or polypropylene, an epoxy resin, rubber, polyimide, and the like can be used. Among these, it is preferable to use a polyolefin resin from the viewpoint of corrosion resistance, chemical resistance, film forming property, economic efficiency, and the like.

<Positive Electrode Terminal Lead and Negative Electrode Terminal Lead>

As a material for the negative electrode and positive electrode terminal leads, a lead to be used in a known stacked type secondary battery can be used. Incidentally, it is preferable that the portion to be brought out from the battery outer packaging material is covered with a heat-shrinkable tube or the like exhibiting heat resistance and insulation property so as not to affect the products (for example, automotive parts and especially electronic devices) by coming in contact with peripheral devices, wires, and the like and thus causing a short circuit.

<Outer Packaging Material; Laminate Film>

As an outer packaging material, a conventionally known metal can case can be used. In addition to this, a power generating element 17 may be packed by using a laminate film 22 as illustrated in FIG. 1 as an outer packaging material. The laminate film can be configured as a three-layer structure formed by polypropylene, aluminum, and nylon in this order, for example. By using such a laminate film, it is possible to easily open the outer packaging material, add the capacity restoring material, and reseal the outer packaging material.

<Method of Producing Lithium Ion Secondary Battery>

The method of producing a lithium ion secondary battery is not particularly limited, and the lithium ion secondary battery can be produced by a known method. Specifically, the method includes (1) fabrication of electrodes, (2) fabrication of a single battery layer, (3) fabrication of a power generating element, and (4) production of a stacked type battery. Hereinafter, the method of producing a lithium ion secondary battery will be described with reference to an example, but the present invention is not limited thereto.

(1) Fabrication of Electrodes (Positive Electrode and Negative Electrode)

The electrode (positive electrode or negative electrode) can be fabricated, for example, by preparing an active material slurry (positive electrode active material slurry or negative electrode active material slurry), coating the active material slurry on a current collector, and drying and then pressing the current collector coated with the active material slurry. The active material slurry contains the active material (positive electrode active material or negative electrode active material) described above, a binder, an electric conductive auxiliary, and a solvent.

The solvent is not particularly limited, and N-methyl-2-pyrrolidone (NMP), dimethylformamide, dimethylacetamide, methylformamide, cyclohexane, hexane, water, or the like can be used.

The method of coating the active material slurry on the current collector is not particularly limited, and examples thereof may include a screen printing method, a spray coating method, an electrostatic spray coating method, an inkjet method, and a doctor blade method.

The method of drying the coating film formed on the surface of the current collector is not particularly limited, and at least a part of the solvent in the coating film may be removed. Examples of the drying method may include heating. The drying conditions (drying time, drying temperature, and the like) can be appropriately set according to the volatilization rate of the solvent contained in the active material slurry to be applied, the coating amount of the active material slurry, and the like. Incidentally, a part of the solvent may remain. The remaining solvent can be removed in a pressing step or the like which will be described later.

The pressing unit is not particularly limited, and for example, a calendar roll, a flat plate press, or the like can be used.

(2) Fabrication of Single Battery Layer

The single battery layer can be fabricated by stacking the electrodes (positive electrode and negative electrode) fabricated in (1) via an electrolyte layer.

(3) Fabrication of Power Generating Element

The power generating element can be fabricated by stacking the single battery layers by appropriately taking the output and capacity of the single battery layer, the output and capacity required as a battery, and the like into consideration.

(4) Production of Stacked Type Battery

As a configuration of the battery, various shapes such as a square shape, a paper shape, a stacked shape, a cylindrical shape, and a coin shape can be employed. In addition, the current collector, the insulating plate, and the like of the component parts are not particularly limited, and they may be selected according to the above shape. However, in the present embodiment, a stacked type battery is preferable. In the stacked type battery, a lead is joined to the current collector of the power generating element obtained above and this positive electrode lead or negative electrode lead is joined to the positive electrode tab or the negative electrode tab. Thereafter, the power generating element is placed in a laminate sheet such that the positive electrode tab and the negative electrode tab are exposed to the outside of the battery, the electrolyte is injected into the laminate sheet by using an injector, and the laminate sheet is then sealed in a vacuum, whereby a stacked type battery can be produced.

(5) Activation Treatment and the Like

Furthermore, in the present embodiment, it is preferable to further subject the stacked type battery thus obtained to the initial charge treatment, the gas removal treatment, and the activation treatment under the following conditions (see Example 1) from the viewpoint of enhancing the performance and durability of the stacked type battery obtained above. In this case, in order to conduct the gas removal treatment, when sealing the laminate sheet in the production of the stacked type battery of (4) above, the three sides of the laminate sheet (outer packaging material) are completely sealed (main sealing) in a rectangular shape by thermocompression bonding and the remaining one side is temporarily sealed by thermocompression bonding. The remaining one side may be, for example, fastened with clips so as to be freely opened and closed but it is preferably temporarily sealed by thermocompression bonding from the viewpoint of mass production (production efficiency). This is because the adjustment of temperature and pressure for thermocompression bonding is only required to in this case. In the case of temporarily sealing the remaining one side by thermocompression bonding, the laminate sheet can be opened by lightly applying force, may be temporarily sealed again by thermocompression bonding after degassing, and is finally required to be completely sealed (main sealing) by thermocompression bonding.

(Initial Charge Treatment)

The aging treatment of the battery is preferably conducted as follows. The battery is charged (SOC: about 20%) at 25° C. and 0.05 C for 4 hours by the constant current charging method. Subsequently, the battery is charged to 4.45 V at 25° C. and a 0.1 C rate, charge is then stopped, and the battery is retained for about 2 days (48 hours) in that state (SOC: about 70%).

(Initial (First) Gas Removal Treatment)

Next, as the initial (first) gas removal treatment, the following treatment is conducted. First, the one side that is temporarily sealed by thermocompression bonding is opened, the gas is removed for 5 minutes at 10±3 hPa, and the one side is then temporarily sealed again by thermocompression bonding. The battery is shaped by being further pressurized by a roller (surface pressure: 0.5±0.1 MPa) so as to bring the electrode and the separator into sufficiently close contact with each other.

(Activation Treatment)

Next, as the activation treatment method, the following electrochemical pretreatment method is implemented.

First, a cycle to charge the battery at 25° C. and 0.1 C by the constant current charging method until the voltage reaches 4.45 V and then to discharge the battery to 2.0 V at 0.1 C is conducted two times. In the same manner, a cycle to charge the battery at 25° C. and 0.1 C by the constant current charging method until the voltage reaches 4.55 V and then to discharge the battery to 2.0 V at 0.1 C is conducted one time, and a cycle to charge the battery at 0.1 C until the voltage reaches 4.65 V and then to discharge the battery to 2.0 V at 0.1 C is conducted one time. Furthermore, a cycle to charge the battery at 25° C. and 0.1 C by the constant current charging method until the voltage reaches 4.75 V and then to discharge the battery to 2.0 V at 0.1 C is conducted one time.

Incidentally, here, as the activation treatment method, an electrochemical pretreatment method in a case in which a constant current charging method is used and the voltage is used as the termination condition is described as an example, but a constant current and constant voltage charging method may be used as the charging method. In addition, the amount of electric charge and the time may be used as the termination condition other than the voltage.

(Last (Second) Gas Removal Treatment)

Next, as the last (second) gas removal treatment, the following treatment is conducted. First, the one side that is temporarily sealed by thermocompression bonding is opened, the gas is removed for 5 minutes at 10±3 hPa, and the one side is then subjected to thermocompression bonding again for main sealing. The battery is shaped by being further pressurized by a roller (surface pressure: 0.5±0.1 MPa) so as to bring the electrode and the separator into sufficiently close contact with each other.

In the present embodiment, it is possible to enhance the performance and durability of the battery obtained by subjecting the stacked type battery to the initial charge treatment, the gas removal treatment, and the activation treatment described above.

[Assembled Battery]

The assembled battery is one configured by connecting a plurality of batteries. In detail, the assembled battery is one configured by serializing, parallelizing, or both serializing and parallelizing at least two or more batteries. It is possible to freely adjust the capacity and the voltage by serializing and parallelizing the batteries.

A plurality of batteries can be connected in series or in parallel to form a compact assembled battery that can be attached and detached. Moreover, a plurality of these compact assembled batteries that can be attached and detached can be connected in series or in parallel to form an assembled battery which has a high capacity and a high output and is thus suitable for a vehicle driving power source and an auxiliary power source which are required to have a high volume energy density and a high volume output density. How many batteries are connected to fabricate an assembled battery and how many stages of compact assembled batteries are stacked to fabricate a large-capacity assembled battery may be determined according to the capacity and output of the battery to be mounted on a vehicle (electric vehicle).

[Vehicle]

The electric device of the present invention including the lithium ion secondary battery according to the present embodiment maintains the discharge capacity and exhibits favorable cycle characteristics even after being used for a long period of time. Furthermore, the electric device has a high volume energy density. In vehicle applications such as an electric vehicle, a hybrid electric vehicle, a fuel cell vehicle, and a hybrid fuel cell vehicle, the battery is required to have a longer lifespan as well as a larger capacity and a larger size as compared to electric and portable electronic device applications. Hence, the lithium ion secondary battery (electric device) described above can be suitably utilized as a power source for a vehicle, for example, as a vehicle driving power source and an auxiliary power source.

Specifically, a battery or an assembled battery configured by combining a plurality of these can be mounted on a vehicle. In the present invention, it is possible to configure a battery which has a long lifespan and exhibits excellent long-term reliability and output characteristics, and it is thus possible to configure a plug-in hybrid electric vehicle having a long EV traveling distance and an electric vehicle having a long mileage per charge by mounting such a battery. A highly reliable motor vehicle having a long lifespan is configured by using the battery or an assembled battery configured by combining a plurality of these, for example, in a hybrid vehicle, a fuel cell vehicle, an electric vehicle (each vehicle includes a two-wheeled vehicle (motorcycles) and a three-wheeled vehicle in addition to a four-wheeled vehicle (a commercial vehicle such as a passenger vehicle, a truck, or a bus, a light motor vehicle, or the like) in the case of motor vehicles. However, the application is not limited to motor vehicles, but, for example, the battery and the assembled battery can be applied to various kinds of power sources of other vehicles, for example, moving bodies such as an electric train or can also be utilized as a mounting power source of an uninterruptible power supply device.

Hereinafter, the present invention will be described in more detail with reference to Examples and Comparative Examples, but the present invention is not limited to the following Examples at all.

EXAMPLE 1

(Preparation of Solid-Solution Positive Electrode Active Material C1)

1. To 200 g of pure water, 28.61 g of manganese sulfate monohydrate (molecular weight: 223.06 g/mol) and 17.74 g of nickel sulfate hexahydrate (molecular weight: 262.85 g/mol) were added and dissolved by stirring, thereby preparing a mixed solution.

2. Next, ammonia water was added to this mixed solution dropwise until to pH 7, and further a $Na_2CO_3$ solution was added thereto dropwise to precipitate the composite carbonate salt (the pH was kept at 7 with ammonia water while the $Na_2CO_3$ solution was being added dropwise).

3. Thereafter, the precipitate was suction filtered, further thoroughly washed with water, and then dried in a drying oven at 120° C. for 5 hours.

4. The dried powder was crushed by using a mortar and then temporarily calcined at 500° C. for 5 hours.

5. The temporarily calcined powder was mixed with 10.67 g of lithium hydroxide monohydrate (molecular weight: 41.96 g/mol), and the mixture was crushed and mixed for 30 minutes.

6. This powder was temporarily calcined at 500° C. for 2 hours and then calcined at 900° C. for 12 hours, thereby obtaining a solid-solution positive electrode active material C1.

The composition of the solid-solution positive electrode active material C1 thus obtained was as follows.
Composition: C1, $Li_{1.5}[Ni_{0.45}Mn_{0.85}[Li]_{0.20}]O_3$ When the composition of the solid-solution positive electrode active material C1 is applied to Formula (3), $a+b+c+d=1.5$, $d=0.20$, $a+b+c=1.3$, and z represents the number of oxygen satisfying the valence, and the composition thus satisfies the requirement of Formula (3).

(Coating of $Al_2O_3$ on Surface of Solid-Solution Positive Electrode Active Material C1) To 100 g of pure water, 10.0 g of the solid-solution positive electrode active material C1 obtained in the "Preparation of Solid-Solution Positive Electrode Active Material C1" described above and 0.37 g of aluminum nitrate nonahydrate (molecular weight: 375.13 g/mol) were added and mixed by stirring, thereby preparing a mixed solution.

2. Next, 5% ammonia water was gradually added dropwise to this mixed solution while being stirred until to have a pH of from 7 to 8, thereby precipitating aluminum hydroxide on the particle surface of the solid-solution positive electrode active material C1. The resultant solution was continuously stirred and mixed for further 5 hours.

3. Thereafter, the precipitate was suction filtered, further thoroughly washed with water, and then dried in a drying oven at 100° C. for 1 hour.

4. The dried powder was crushed by using a mortar and then calcined at 450° C. for 5 hours, thereby obtaining a solid-solution positive electrode active material C1.

The solid-solution positive electrode active material C1 thus obtained was a powder in which a coating layer composed of 0.5% by weight of $Al_2O_3$ with respect to the entire amount (100% by weight) of the solid-solution positive electrode active material C1 was formed on the particle surface of the solid-solution positive electrode active material C1 obtained in the "Preparation of Solid-Solution Positive Electrode Active Material C1" described above. The average particle diameter of the solid-solution positive electrode active material C1 thus obtained was 8 μm. Incidentally, the average particle diameter of the solid-solution positive electrode active materials obtained in the other Examples and Comparative Examples was also the same as this.

(Fabrication of Positive Electrode C1 Having Positive Electrode Active Material Layer Formed on One Side of Current Collector)

(Composition of Slurry for Positive Electrode)

The slurry for positive electrode had the following composition.

Positive electrode active material: 9.4 parts by weight of $Al_2O_3$-coated solid-solution positive electrode active material C1 obtained above Electric conductive auxiliary: 0.15 part by weight of flaky graphite 0.15 part by weight of acetylene black Binder: 0.3 part by weight of polyvinylidene fluoride (PVDF)

Solvent: 8.2 parts by weight of N-methyl-2-pyrrolidone (NMP).

When this composition is applied to Formula (2), e=94, and the composition thus satisfies the requirement of Formula (2).

(Production of Slurry for Positive Electrode)

The slurry for positive electrode having the above composition was prepared as follows. First, 4.0 parts by weight of a solvent (NMP) was added to 2.0 parts by weight of a 20% binder solution in which a binder was dissolved in a solvent (NMP) in a 50 ml disposable cup, and the mixture was stirred for 1 minute by using a stirring defoaming machine (Planetary Centrifugal Mixer: THINKY MIXER AR-100), thereby preparing a diluted binder solution. Next, 0.4 part by weight of an electric conductive auxiliary, 9.2 parts by weight of the solid-solution positive electrode active material C1, and 2.6 parts by weight of a solvent (NMP) were added to this diluted binder solution, the mixture was stirred for 3 minutes by using a stirring defoaming machine, thereby preparing the slurry for positive electrode (concentration of solids: 55% by weight).

(Coating and Drying of Slurry for Positive Electrode)

The slurry for positive electrode was coated on one side of an aluminum current collector having a thickness of 20 μm by using an automatic coating apparatus (doctor blade: Automatic Coating Apparatus PI-1210 manufactured by TESTER SANGYO CO., LTD.). Subsequently, the current collector coated with this slurry for positive electrode was dried (100° C. to 110° C., drying time: 30 minutes) on a hot plate, thereby forming a sheet-shaped positive electrode in which the amount of NMP remaining in the positive electrode active material layer was controlled to 0.02% by weight or less.

(Press of Positive Electrode)

The sheet-shaped positive electrode was compression-molded by using a roller press and cut, thereby fabricating a positive electrode. At this time, the coating amount was adjusted in consideration of the discharge capacity of the positive electrode active material and the composition of the slurry for positive electrode so that the discharge capacity of the positive electrode C1 was 5.55 mAh/cm$^2$ (the same applies to the following positive electrodes C2 to C10 as well).

(Drying of Positive Electrode)

Next, the drying treatment of the positive electrode fabricated by the above procedure was conducted in a vacuum drying furnace. After the positive electrode was placed in the drying furnace, the air in the drying furnace was removed by decreasing the pressure (100 mmHg (1.33×10$^4$ Pa)) at room temperature (25° C.). Subsequently, the temperature was raised to 120° C. at 10° C./min while a nitrogen gas was flowing (100 cm$^3$/minute), the nitrogen gas in the furnace was exhausted by decreasing the pressure again at 120° C., and the state was retained for 12 hours, and the temperature was then lowered to room temperature. The moisture on the surface of the positive electrode was thus removed, thereby obtaining a positive electrode C1.

(Fabrication of Negative Electrode A1 Having Negative Electrode Active Material Layer Formed on One Side of Current Collector)

(Production of Si-Containing Alloy)

$Si_{80}Sn_{10}Ti_{10}$ (unit: % by mass, the same applies hereinafter) was used as a Si-containing alloy of a negative electrode active material. Incidentally, the Si-containing alloy was produced by a mechanical alloying method. Specifically, by using a planetary ball mill apparatus P-6 manufactured by Fritsch GmbH, zirconia crushing balls and raw material powders of the alloy were put in a zirconia crushing pot, alloyed (alloying treatment) at 600 rpm for 24 hours, and then subjected to a crushing treatment at 400 rpm for 1 hour. Incidentally, the average particle diameter of the Si-containing alloy (negative electrode active material) powder thus obtained was 0.3 μm.

(Composition of Slurry for Negative Electrode)

The slurry for negative electrode had the following composition.

Negative electrode active material: 80 parts by weight of Si-containing alloy ($Si_{80}Sn_{10}Ti_{10}$)

Electric conductive auxiliary: 5 parts by weight of SuperP

Binder: 15 parts by weight of polyimide

Solvent: proper amount of N-methyl-2-pyrrolidone (NMP).

When this composition is applied to Formula (1), α=80, and the composition thus satisfies the requirement of Formula (1).

(Production of Slurry for Negative Electrode)

The slurry for negative electrode having the above composition was prepared as follows. First, a binder solution in which a binder was dissolved was added to a solvent (NMP), and the mixture was stirred for 1 minute by using a stirring defoaming machine, thereby preparing a diluted binder solution. The electric conductive auxiliary, the negative electrode active material powder, and the solvent (NMP) were added to this diluted binder solution, and the mixture was stirred for 3 minutes by using a stirring defoaming machine, thereby preparing the slurry for negative electrode.

(Coating and Drying of Slurry for Negative Electrode)

The slurry for negative electrode was coated on one side of an electrolytic copper current collector having a thickness of 10 μm by using an automatic coating apparatus. Subsequently, the current collector coated with this slurry for negative electrode was dried (100° C. to 110° C., drying time: 30 minutes) on a hot plate, thereby forming a sheet-shaped negative electrode in which the amount of NMP remaining in the negative electrode active material layer was controlled to 0.02% by weight or less.

(Press of Negative Electrode)

The sheet-shaped negative electrode thus obtained was compression-molded by using a roller press and cut, thereby fabricating a negative electrode. At this time, the coating amount was adjusted in consideration of the discharge capacity of the negative electrode active material and the composition of the slurry for negative electrode so that the discharge capacity of the negative electrode A1 was 5.83 mAh/cm$^2$ (the same applies to the following negative electrodes A2 to A5 as well). The surface of this negative electrode was observed but the generation of cracks was not confirmed.

(Drying of Negative Electrode)

Next, the drying treatment of the negative electrode fabricated by the above procedure was conducted in a vacuum drying furnace. After the negative electrode was placed in the drying furnace, the air in the drying furnace was removed by decreasing the pressure (100 mmHg (1.33×10$^4$ Pa)) at room temperature (25° C.). Subsequently, the temperature was raised to 325° C. at 10° C./min while a nitrogen gas was flowing (100 cm$^3$/minute), the nitrogen gas in the furnace was exhausted by decreasing the pressure again at 325° C., and the state was retained for 24 hours, and the temperature was then lowered to room temperature. The moisture on the surface of the negative electrode was thus removed, thereby obtaining a negative electrode A1.

[Confirmation of Capacity of Positive Electrode C1]

[Fabrication of Coin Cell]

The positive electrode C1 (punched to have a diameter of 15 mm) obtained above and a counter electrode composed of a lithium foil (manufactured by HONJO METAL CO., LTD., diameter: 16 mm, thickness: 200 μm) were allowed to face each other via a separator (Celgard 2400 manufactured by Celgard, LLC., diameter: 17 mm), and an electrolytic solution was then injected thereinto, thereby fabricating a CR 2032 type coin cell.

Incidentally, as the electrolytic solution, a solution prepared by dissolving $LiPF_6$ (lithium hexafluorophosphate) in a mixed nonaqueous solvent in which ethylene carbonate (EC) and diethyl carbonate (DEC) were mixed in a volume ratio of 1:1 so as to have a concentration of 1 M was used.

The activation treatment was conducted in a thermostatic chamber (PFU-3K manufactured by ESPEC CORP.) set at a temperature of 298 K (25° C.) by using a charge and discharge tester (HJ 0501 SMSA manufactured by HOKUTO DENKO CORP.).

[Activation Treatment]

A cycle to charge the battery at 25° C. and 0.1 C by the constant current charging method until the voltage reached 4.45 V and then to discharge the battery to 2.0 V at 0.1 C was conducted two times. In the same manner, a cycle to charge the battery at 25° C. and 0.1 C by the constant current charging method until the voltage reached 4.55 V and then to discharge the battery to 2.0 V at 0.1 C was conducted one time, and a cycle to charge the battery at 0.1 C until the voltage reached 4.65 V and then to discharge the battery to 2.0 V at 0.1 C was conducted one time. Furthermore, a cycle to charge the battery at 25° C. and 0.1 C by the constant current charging method until the voltage reached 4.75 V and then to discharge the battery to 2.0 V at 0.1 C was conducted one time.

[Fabrication of Laminate Cell]

The positive electrode C1 obtained above was cut out such that the area of the active material layer was 2.5 cm in length×2.0 cm in width, the non-coated sides (the side which was not coated with the slurry of the aluminum current collector foil) of these two sheets were combined such that the current collectors faced each other, and the current collector portions were spot-welded. By this, a positive electrode having the outer peripheral portions integrated by spot welding and a positive electrode active material layer formed on both sides of two current collector foils stacked one over the other was formed. Thereafter, an aluminum positive electrode tab (positive electrode current collecting plate) was further welded to the current collector portion, thereby forming a positive electrode C11.. That is, the positive electrode C11 has a configuration in which a positive electrode active material layer is formed on both sides of a current collector foil.

Meanwhile, the negative electrode A1 obtained above was cut out such that the area of the active material layer was 2.7 cm in length×2.2 cm in width, thereafter, an electrolytic copper negative electrode tab was further welded to the current collector portion, thereby forming a negative electrode A11. That is, the negative electrode A11 has a configuration in which a negative electrode active material layer is formed on one side of a current collector.

A porous polypropylene separator (S) (3.0 cm in length× 2.5 cm in width, thickness: 25 µm, porosity: 55%) was sandwiched between these negative electrode A11 and positive electrode C11 to which tabs were welded, thereby fabricating a stacked type power generating element consisting of five layers. The configuration of the stacked type power generating element was a configuration of negative electrode (one side)/separator/positive electrode (both sides)/separator/negative electrode (one side), namely, a configuration in which A11-(S)-C11-(S)-A11 were stacked in this order. Subsequently, both sides of the power generating element were inserted in an outer packaging material (3.5 cm in length×3.5 cm in width) formed of an aluminum-laminated film, and the three sides of the outer packaging material were sealed by thermocompression bonding to house the power generating element. Into this power generating element, 0.8 cm$^3$ of the electrolytic solution (the configuration having five layers is a configuration having 2 cells, and the injection amount per cell is thus 0.4 cm$^3$) was injected, and the remaining one side was then temporarily sealed by thermocompression bonding, thereby fabricating a laminate type battery. The battery was retained at 25° C. for 24 hours while being pressurized at a surface pressure of 0.5 Mpa in order to allow the electrolytic solution to sufficiently permeate into the electrode pores.

Incidentally, in the preparation of the electrolytic solution, 1.0 M of LiPF$_6$ (electrolyte) was first dissolved in a mixed solvent composed of 30% by volume of ethylene carbonate (EC) and 70% by volume of diethyl carbonate (DEC). Thereafter, 1.8% by weight of lithium difluorophosphate (LiPO$_2$F$_2$) as lithium fluorophosphate and 1.5% by weight of methylene methanedisulfonic acid ester (MMDS) to act as additives were dissolved in the solution, and the resultant solution was used as the electrolytic solution.

In the following Examples, the active material was produced in conformity with Example 1. That is, the active material was produced in the same manner as in Example 1 described above except those stated below.

(Solid-Solution Positive Electrode Active Material C2)

The solid-solution positive electrode active material C2, Li$_{1.5}$[Ni$_{0.525}$Mn$_{0.825}$[Li]$_{0.15}$]O$_3$ was produced. When the composition of the solid-solution positive electrode active material C2 is applied to Formula (3), a+b+c+d=1.5, d=0.15, and a+b+c=1.35, and the composition thus satisfies the requirement of Formula (3). In conformity with Example 1, the coating amount of the coating layer composed of Al$_2$O$_3$ was set to 0.5% by weight with respect to the entire amount (100% by weight) of the solid-solution positive electrode active material C2 coated with the coating layer.

(Solid-Solution Positive Electrode Active Material C3)

The solid-solution positive electrode active material C3, Li$_{1.5}$[Ni$_{0.375}$Mn$_{0.875}$[Li]$_{0.25}$]O$_3$ was produced. When the composition of the solid-solution positive electrode active material C3 is applied to Formula (3), a+b+c+d=1.5, d=0.25, and a+b+c=1.2, and the composition thus satisfies the requirement of Formula (3). In conformity with Example 1, the coating amount of the coating layer composed of Al$_2$O$_3$ was set to 0.5% by weight with respect to the entire amount (100% by weight) of the solid-solution positive electrode active material C3 coated with the coating layer.

(Solid-Solution Positive Electrode Active Material C4)

The solid-solution positive electrode active material C4, Li$_{1.5}$[Ni$_{0.600}$Mn$_{0.800}$[Li]$_{0.10}$]O$_3$ was produced. When the composition of the solid-solution positive electrode active material C4 is applied to Formula (3), a+b+c+d=1.5, d=0.10, and a+b+c=1.40, and the composition thus satisfies the requirement of Formula (3). In conformity with Example 1, the coating amount of the coating layer composed of Al$_2$O$_3$ was set to 0.5% by weight with respect to the entire amount (100% by weight) of the solid-solution positive electrode active material C4 coated with the coating layer.

(Solid-Solution Positive Electrode Active Material C5)

The solid-solution positive electrode active material C5, Li$_{1.5}$[Ni$_{0.300}$Mn$_{0.900}$[Li]$_{0.30}$]O$_3$ was produced. When the composition of the solid-solution positive electrode active material C5 is applied to Formula (3), a+b+c+d=1.5, d=0.30, and a+b+c=1.20, and the composition thus satisfies the requirement of Formula (3). In conformity with Example 1, the coating amount of the coating layer composed of Al$_2$O$_3$ was set to 0.5% by weight with respect to the entire amount (100% by weight) of the solid-solution positive electrode active material C5 coated with the coating layer.

(Solid-Solution Positive Electrode Active Material C6)

The solid-solution positive electrode active material C6, Li$_{1.5}$ [Ni$_{0.225}$Mn$_{0.925}$ [Li]$_{0.35}$]O$_3$ was produced. When the composition of the solid-solution positive electrode active material C6 is applied to Formula (3), a+b+c+d=1.5, d=0.35, and a+b+c=1.15, and the composition thus satisfies the requirement of Formula (3). In conformity with Example 1, the coating amount of the coating layer composed of Al$_2$O$_3$ was set to 0.5% by weight with respect to the entire amount (100% by weight) of the solid-solution positive electrode active material C6 coated with the coating layer.

(Solid-Solution Positive Electrode Active Material C7)

The solid-solution positive electrode active material C1 before being coated with a metal oxide was produced in conformity with Example 1. Subsequently, coating of $Al_2O_3$ was conducted in the same manner as in Example 1. At this time, the coating amount of the coating layer composed of $Al_2O_3$ was set to 2.0% by weight with respect to the entire amount (100% by weight) of the solid-solution positive electrode active material C7 coated with the coating layer.

(Solid-Solution Positive Electrode Active Material C8)

The solid-solution positive electrode active material C1 before being coated with a metal oxide was produced in conformity with Example 1. Subsequently, a coating layer composed of zirconium oxide was formed on the particle surface of the solid-solution positive electrode active material C1 by using ammonium zirconium carbonate ($Zr(OH)_2$ $(CO_3)_2 \cdot 2NH_4$, molecular weight: 281.33 g/mol) instead of aluminum nitrate, thereby obtaining the solid-solution positive electrode active material C8. At this time, in conformity with Example 1, the coating amount of the coating layer composed of $ZrO_2$ was set to 0.5% by weight with respect to the entire amount (100% by weight) of the solid-solution positive electrode active material C8 coated with the coating layer.

(Solid-Solution Positive Electrode Active Material C9)

The solid-solution positive electrode active material C1 before being coated with a metal oxide was produced in conformity with Example 1. Subsequently, a coating layer composed of titanium oxide was formed on the particle surface of the solid-solution positive electrode active material C1 by using tetraisopropoxytitanium ($C_{14}H_{28}O_4Ti$, molecular weight: 284.22 g/mol), thereby obtaining the solid-solution positive electrode active material C9. At this time, the coating layer was formed as follows.

First, 10.0 g of the solid-solution positive electrode active material C1 was added to 100 g of pure water and they were mixed together by stirring, thereby preparing a mixed solution. Subsequently, a tetraisopropoxytitanium solution was gradually added dropwise to this mixed solution while being stirred to precipitate titanium hydroxide on the particle surface of the solid-solution positive electrode active material C1. The resultant solution was continuously stirred and mixed for further 5 hours. Thereafter, the precipitate was suction filtered, further thoroughly washed with water, and then dried in a drying oven at 100° C. for 1 hour. The dried powder was crushed by using a mortar and then calcined at 450° C. for 5 hours, thereby forming a coating layer composed of titanium oxide on the particle surface.

(Solid-Solution Positive Electrode Active Material C10)

The solid-solution positive electrode active material C1, $Li_{1.5}[Ni_{0.45}Mn_{0.85}[Li]_{0.20}]O_3$ in which a coating layer composed of a metal oxide was not formed was used as the solid-solution positive electrode active material C10.

In conformity with Example 1, the positive electrodes C2 to C10 were fabricated by respectively using the solid-solution positive electrode active materials C2 to C10 fabricated above. The compositions of the positive electrodes C1 to C10 thus obtained are summarized in the following Table 1.

TABLE 1

| Positive electrode | Composition | | | | | | |
|---|---|---|---|---|---|---|---|
| | Li | a | b | c | d | Oxide | % by weight |
| C1 | 1.500 | 0.450 | 0.850 | — | 0.200 | Al2O3 | 0.5 |
| C2 | 1.500 | 0.525 | 0.825 | — | 0.150 | Al2O3 | 0.5 |
| C3 | 1.500 | 0.375 | 0.875 | — | 0.250 | Al2O3 | 0.5 |
| C4 | 1.500 | 0.600 | 0.800 | — | 0.100 | Al2O3 | 0.5 |

TABLE 1-continued

| Positive electrode | Composition | | | | | | |
|---|---|---|---|---|---|---|---|
| | Li | a | b | c | d | Oxide | % by weight |
| C5 | 1.500 | 0.300 | 0.900 | — | 0.300 | Al2O3 | 0.5 |
| C6 | 1.500 | 0.225 | 0.925 | — | 0.350 | Al2O3 | 0.5 |
| C7 | 1.500 | 0.450 | 0.850 | — | 0.200 | Al2O3 | 2.0 |
| C8 | 1.500 | 0.450 | 0.850 | — | 0.200 | ZrO2 | 0.5 |
| C9 | 1.500 | 0.450 | 0.850 | — | 0.200 | TiO2 | 0.5 |
| C10 | 1.500 | 0.450 | 0.850 | — | 0.200 | — | — |

(Negative Electrode A2)

A negative electrode active material and a negative electrode were fabricated by the same method as in the negative electrode A1 described above except that the composition of the Si-containing alloy (negative electrode active material) was changed to $Si_{70}Sn_{15}Ti_{15}$. Incidentally, the average particle diameter of the Si-containing alloy (negative electrode active material) powder thus obtained was 0.3 μm.

(Negative Electrode A3)

A negative electrode active material and a negative electrode were fabricated by the same method as in the negative electrode A1 described above except that the composition of the Si-containing alloy (negative electrode active material) was changed to $Si_{59}Sn_{22}Ti_{19}$ and the time for the alloying treatment when fabricating the silicon-containing alloy was changed to 25 hours. Incidentally, the average particle diameter of the Si-containing alloy (negative electrode active material) powder thus obtained was 0.3 μm.

(Negative Electrode A4)

A negative electrode active material and a negative electrode were fabricated by the same method as in the negative electrode A3 described above except that the time for the alloying treatment when fabricating the Si-containing alloy was changed to 50 hours. Incidentally, the average particle diameter of the Si-containing alloy (negative electrode active material) powder thus obtained was 0.3 μm.

(Negative Electrode A5)

A negative electrode active material and a negative electrode were fabricated by the same method as in the negative electrode A1 described above except that the composition of the Si-containing alloy (negative electrode active material) was changed to $Si_{90}Ti_{10}$. Incidentally, the average particle diameter of the silicon-containing alloy (negative electrode active material) powder thus obtained was 0.3 μm.

[Analysis of Textural Structure of Negative Electrode Active Material]

The textural structure of each of the negative electrode active materials (Si-containing alloys) used in fabrication of the negative electrodes A1 to A5 described above was analyzed by the electron diffraction method, as a result, diffraction spots and halo patterns indicating the crystallinity of the silicide phase ($TiSi_2$) were observed in any of the negative electrodes A1 to A5, and it was confirmed that the negative electrode active materials had a textural structure in which a crystalline silicide phase was dispersed in the amorphous Si phase of the parent phase.

In addition, the textural structure of each of the negative electrode active materials (Si-containing alloys) used in fabrication of the negative electrodes A1 to A5 described above was analyzed by the X-ray diffraction measurement method. The apparatus and conditions used in the X-ray diffraction measurement method are as follows.

Name of apparatus: X-ray diffractometer (SmartLab 9 kW) manufactured by Rigaku Corporation Voltage and current: 45 kV and 200 mA X-ray wavelength: CuKα1.

Here, the X-ray diffraction spectra acquired for each of the negative electrode active materials (Si-containing alloys) are illustrated in FIGS. 3A to 3E. In addition, the ratio value (B/A) of the diffraction peak intensity B of $TiSi_2$ in a range of 2θ=37 to 45° to the diffraction peak intensity A of the (111) plane of Si in a range of 2θ=24 to 33° obtained from these X-ray diffraction spectra are presented in the following Tables 2 to 6. Incidentally, it has also been confirmed that the entire Ti contained in the silicon-containing alloy is present as a silicide ($TiSi_2$) phase by this X-ray diffraction analysis.

Subsequently, batteries were fabricated in conformity with Example 1 by combining the positive electrodes C1 to C10 obtained above and the negative electrodes A1 to A5 obtained above as presented in the following Tables 2 to 6 (Examples 1 to 40 and Comparative Examples 1 to 10).

Thereafter, the power generating elements of the respective batteries obtained above were set in an evaluation cell attachment jig, the positive electrode lead and the negative electrode lead were attached to the respective tab end portions of the power generating elements, and test was conducted.

[Evaluation of Battery Characteristics]

The laminate type battery fabricated above was subjected to the initial charge treatment and the activation treatment under the following conditions to evaluate the performance.

(Initial Charge Treatment)

The aging treatment of the battery was conducted as follows. The battery was charged (SOC: about 20%) at 25° C. and 0.05 C for 4 hours by the constant current charging method. Subsequently, the battery was charged to 4.45 V at 25° C. and a 0.1 C rate, charge was then stopped, and the battery was retained for about 2 days (48 hours) in that state (SOC: about 70%).

(Gas Removal Treatment 1)

The one side that was temporarily sealed by thermocompression bonding was opened, the gas was removed for 5 minutes at 10±3 hPa, and the one side was then temporarily sealed again by thermocompression bonding. The battery was shaped by being further pressurized by a roller (surface pressure: 0.5±0.1 MPa) so as to bring the electrode and the separator into sufficiently close contact with each other.

(Activation Treatment)

A cycle to charge the battery at 25° C. and 0.1 C by the constant current charging method until the voltage reached 4.45 V and then to discharge the battery to 2.0 V at 0.1 C was conducted two times. In the same manner, a cycle to charge the battery at 25° C. and 0.1 C by the constant current charging method until the voltage reached 4.55 V and then to discharge the battery to 2.0 V at 0.1 C was conducted one time, and a cycle to charge the battery at 0.1 C until the voltage reached 4.65 V and then to discharge the battery to 2.0 V at 0.1 C was conducted one time. Furthermore, a cycle to charge the battery at 25° C. and 0.1 C by the constant current charging method until the voltage reached 4.75 V and then to discharge the battery to 2.0 V at 0.1 C was conducted one time.

(Gas Removal Treatment 2)

The one side that was temporarily sealed by thermocompression bonding was opened, the gas was removed for 5 minutes at 10±3 hPa, and the one side was then subjected to thermocompression bonding again for main sealing. The battery was shaped by being further pressurized by a roller (surface pressure: 0.5±0.1 MPa) so as to bring the electrode and the separator into sufficiently close contact with each other.

(Evaluation on Cycle Durability)

The cycle durability of the respective lithium ion secondary batteries (coin cells) fabricated above was evaluated under the following charge and discharge test conditions.

(Charge and Discharge Test Conditions)

1) Charge and Discharge Tester: HJ 0501 SMSA (manufactured by HOKUTO DENKO CORP.)

2) Charge and discharge conditions [Charge process] 0.3 C, 2 V 10 mV (constant current and constant voltage mode) [Discharge process] 0.3 C, 10 mV→2 V (constant current mode)

3) Thermostatic chamber: PFU-3K (manufactured by ESPEC CORP.)

4) Evaluation temperature: 300 K (27° C.).

The evaluation cell was charged from 2 V to 10 mV at 0.1 mA in a constant current and constant voltage mode in a thermostatic chamber set at the above evaluation temperature by using a charge and discharge tester in the charge process (referred to as the process of intercalating Li into the evaluation electrode). Thereafter, the evaluation cell (coin cell) was discharged from 10 mV to 2 V at 0.3 C in a constant current mode in the discharge process (referred to as the process of deintercalating Li from the evaluation electrode). The charge and discharge cycle described above was taken as one cycle, and charge and discharge test was conducted from the initial cycle (1st cycle) to the 100th cycle under the same charge and discharge conditions. Thereafter, the results for the proportion (discharge capacity retention rate [%]) of the discharge capacity in the 100th cycle to the discharge capacity in the 1st cycle are presented in the following Tables 2 to 6.

TABLE 2

| | Positive electrode | Negative electrode | Positive electrode active material | | | | | | Negative electrode active material | | | | Intensity ratio of XRD peaks (second phase/first phase) | Cell Discharge capacity retention rate after 100 cycles |
|---|---|---|---|---|---|---|---|---|---|---|---|---|---|---|
| | | | Composition (mol) | | | | Coating of surface | | Composition (wt. %) | | | Time for MA treatment (h) | | |
| | | | Li | a | b | c | d | Oxide | Coating amount (wt.) | Si | Sn | Ti | | | |
| Example 1 | C1 | A1 | 1.500 | 0.450 | 0.850 | — | 0.200 | Al2O3 | 0.5 | 80 | 10 | 10 | 24 | 0.41 | 53 |
| Example 2 | C2 | A1 | 1.500 | 0.525 | 0.825 | — | 0.150 | Al2O3 | 0.5 | 80 | 10 | 10 | 24 | 0.41 | 54 |
| Example 3 | C3 | A1 | 1.500 | 0.375 | 0.875 | — | 0.250 | Al2O3 | 0.5 | 80 | 10 | 10 | 24 | 0.41 | 54 |
| Example 4 | C4 | A1 | 1.500 | 0.600 | 0.800 | — | 0.100 | Al2O3 | 0.5 | 80 | 10 | 10 | 24 | 0.41 | 55 |

TABLE 2-continued

| | Positive electrode | Negative electrode | Positive electrode active material Composition (mol) | | | | | Coating of surface Oxide | Coating amount (wt.) | Negative electrode active material Composition (wt. %) | | | Time for MA treatment (h) | Intensity ratio of XRD peaks (second phase/first phase) | Cell Discharge capacity retention rate after 100 cycles |
|---|---|---|---|---|---|---|---|---|---|---|---|---|---|---|---|
| | | | Li | a | b | c | d | | | Si | Sn | Ti | | | |
| Example 5 | C5 | A1 | 1.500 | 0.300 | 0.900 | — | 0.300 | Al2O3 | 0.5 | 80 | 10 | 10 | 24 | 0.41 | 50 |
| Example 6 | C6 | A1 | 1.500 | 0.225 | 0.925 | — | 0.350 | Al2O3 | 0.5 | 80 | 10 | 10 | 24 | 0.41 | 49 |
| Example 7 | C7 | A1 | 1.500 | 0.450 | 0.850 | — | 0.200 | Al2O3 | 2.0 | 80 | 10 | 10 | 24 | 0.41 | 58 |
| Example 8 | C8 | A1 | 1.500 | 0.450 | 0.850 | — | 0.200 | ZrO2 | 0.5 | 80 | 10 | 10 | 24 | 0.41 | 56 |
| Example 9 | C9 | A1 | 1.500 | 0.450 | 0.850 | — | 0.200 | TiO2 | 0.5 | 80 | 10 | 10 | 24 | 0.41 | 58 |
| Example 10 | C10 | A1 | 1.500 | 0.450 | 0.850 | — | 0.200 | — | — | 80 | 10 | 10 | 24 | 0.41 | 48 |

TABLE 3

| | Positive electrode | Negative electrode | Positive electrode active material Composition (mol) | | | | | Coating of surface Oxide | Coating amount (wt.) | Negative electrode active material Composition (wt. %) | | | Time for MA treatment (h) | Intensity ratio of XRD peaks (second phase/first phase) | Cell Discharge capacity retention rate after 100 cycles |
|---|---|---|---|---|---|---|---|---|---|---|---|---|---|---|---|
| | | | Li | a | b | c | d | | | Si | Sn | Ti | | | |
| Example 11 | C1 | A2 | 1.500 | 0.450 | 0.850 | — | 0.200 | Al2O3 | 0.5 | 70 | 15 | 15 | 24 | 0.89 | 65 |
| Example 12 | C2 | A2 | 1.500 | 0.525 | 0.825 | — | 0.150 | Al2O3 | 0.5 | 70 | 15 | 15 | 24 | 0.89 | 66 |
| Example 13 | C3 | A2 | 1.500 | 0.375 | 0.875 | — | 0.250 | Al2O3 | 0.5 | 70 | 15 | 15 | 24 | 0.89 | 66 |
| Example 14 | C4 | A2 | 1.500 | 0.600 | 0.800 | — | 0.100 | Al2O3 | 0.5 | 70 | 15 | 15 | 24 | 0.89 | 67 |
| Example 15 | C5 | A2 | 1.500 | 0.300 | 0.900 | — | 0.300 | Al2O3 | 0.5 | 70 | 15 | 15 | 24 | 0.89 | 61 |
| Example 16 | C6 | A2 | 1.500 | 0.225 | 0.925 | — | 0.350 | Al2O3 | 0.5 | 70 | 15 | 15 | 24 | 0.89 | 60 |
| Example 17 | C7 | A2 | 1.500 | 0.450 | 0.850 | — | 0.200 | Al2O3 | 2.0 | 70 | 15 | 15 | 24 | 0.89 | 71 |
| Example 18 | C8 | A2 | 1.500 | 0.450 | 0.850 | — | 0.200 | ZrO2 | 0.5 | 70 | 15 | 15 | 24 | 0.89 | 68 |
| Example 19 | C9 | A2 | 1.500 | 0.450 | 0.850 | — | 0.200 | TiO2 | 0.5 | 70 | 15 | 15 | 24 | 0.89 | 71 |
| Example 20 | C10 | A2 | 1.500 | 0.450 | 0.850 | — | 0.200 | — | — | 70 | 15 | 15 | 24 | 0.89 | 59 |

TABLE 4

| | Positive electrode | Negative electrode | Positive electrode active material Composition (mol) | | | | | Coating of surface Oxide | Coating amount (wt.) | Negative electrode active material Composition (wt. %) | | | Time for MA treatment (h) | Intensity ratio of XRD peaks (second phase/first phase) | Cell Discharge capacity retention rate after 100 cycles |
|---|---|---|---|---|---|---|---|---|---|---|---|---|---|---|---|
| | | | Li | a | b | c | d | | | Si | Sn | Ti | | | |
| Example 21 | C1 | A3 | 1.500 | 0.450 | 0.850 | — | 0.200 | Al2O3 | 0.5 | 59 | 22 | 19 | 25 | 2.55 | 70 |
| Example 22 | C2 | A3 | 1.500 | 0.525 | 0.825 | — | 0.150 | Al2O3 | 0.5 | 59 | 22 | 19 | 25 | 2.55 | 71 |

TABLE 4-continued

| | Positive electrode | Negative electrode | Positive electrode active material | | | | | | | Negative electrode active material | | | Time for MA treatment (h) | Intensity ratio of XRD peaks (second phase/first phase) | Cell Discharge capacity retention rate after 100 cycles |
|---|---|---|---|---|---|---|---|---|---|---|---|---|---|---|---|
| | | | Composition (mol) | | | | | Coating of surface | | Composition (wt. %) | | | | | |
| | | | Li | a | b | c | d | Oxide | Coating amount (wt.) | Si | Sn | Ti | | | |
| Example 23 | C3 | A3 | 1.500 | 0.375 | 0.875 | — | 0.250 | Al2O3 | 0.5 | 59 | 22 | 19 | 25 | 2.55 | 71 |
| Example 24 | C4 | A3 | 1.500 | 0.600 | 0.800 | — | 0.100 | Al2O3 | 0.5 | 59 | 22 | 19 | 25 | 2.55 | 73 |
| Example 25 | C5 | A3 | 1.500 | 0.300 | 0.900 | — | 0.300 | Al2O3 | 0.5 | 59 | 22 | 19 | 25 | 2.55 | 66 |
| Example 26 | C6 | A3 | 1.500 | 0.225 | 0.925 | — | 0.350 | Al2O3 | 0.5 | 59 | 22 | 19 | 25 | 2.55 | 64 |
| Example 27 | C7 | A3 | 1.500 | 0.450 | 0.850 | — | 0.200 | Al2O3 | 2.0 | 59 | 22 | 19 | 25 | 2.55 | 76 |
| Example 28 | C8 | A3 | 1.500 | 0.450 | 0.850 | — | 0.200 | ZrO2 | 0.5 | 59 | 22 | 19 | 25 | 2.55 | 74 |
| Example 29 | C9 | A3 | 1.500 | 0.450 | 0.850 | — | 0.200 | TiO2 | 0.5 | 59 | 22 | 19 | 25 | 2.55 | 76 |
| Example 30 | C10 | A3 | 1.500 | 0.450 | 0.850 | — | 0.200 | — | — | 59 | 22 | 19 | 25 | 2.55 | 63 |

TABLE 5

| | Positive electrode | Negative electrode | Positive electrode active material | | | | | | | Negative electrode active material | | | Time for MA treatment (h) | Intensity ratio of XRD peaks (second phase/first phase) | Cell Discharge capacity retention rate after 100 cycles |
|---|---|---|---|---|---|---|---|---|---|---|---|---|---|---|---|
| | | | Composition (mol) | | | | | Coating of surface | | Composition (wt. %) | | | | | |
| | | | Li | a | b | c | d | Oxide | Coating amount (wt.) | Si | Sn | Ti | | | |
| Example 31 | C1 | A4 | 1.500 | 0.450 | 0.850 | — | 0.200 | Al2O3 | 0.5 | 59 | 22 | 19 | 50 | 7.07 | 89 |
| Example 32 | C2 | A4 | 1.500 | 0.525 | 0.825 | — | 0.150 | Al2O3 | 0.5 | 59 | 22 | 19 | 50 | 7.07 | 90 |
| Example 33 | C3 | A4 | 1.500 | 0.375 | 0.875 | — | 0.250 | Al2O3 | 0.5 | 59 | 22 | 19 | 50 | 7.07 | 90 |
| Example 34 | C4 | A4 | 1.500 | 0.600 | 0.800 | — | 0.100 | Al2O3 | 0.5 | 59 | 22 | 19 | 50 | 7.07 | 92 |
| Example 35 | C5 | A4 | 1.500 | 0.300 | 0.900 | — | 0.300 | Al2O3 | 0.5 | 59 | 22 | 19 | 50 | 7.07 | 84 |
| Example 36 | C6 | A4 | 1.500 | 0.225 | 0.925 | — | 0.350 | Al2O3 | 0.5 | 59 | 22 | 19 | 50 | 7.07 | 81 |
| Example 37 | C7 | A4 | 1.500 | 0.450 | 0.850 | — | 0.200 | Al2O3 | 2.0 | 59 | 22 | 19 | 50 | 7.07 | 97 |
| Example 38 | C8 | A4 | 1.500 | 0.450 | 0.850 | — | 0.200 | ZrO2 | 0.5 | 59 | 22 | 19 | 50 | 7.07 | 93 |
| Example 39 | C9 | A4 | 1.500 | 0.450 | 0.850 | — | 0.200 | TiO2 | 0.5 | 59 | 22 | 19 | 50 | 7.07 | 97 |
| Example 40 | C10 | A4 | 1.500 | 0.450 | 0.850 | — | 0.200 | — | — | 59 | 22 | 19 | 50 | 7.07 | 80 |

TABLE 6

| | Positive electrode | Negative electrode | Positive electrode active material | | | | | | Negative electrode active material | | | | Intensity ratio of XRD peaks (second phase/first phase) | Cell Discharge capacity retention rate after 100 cycles |
|---|---|---|---|---|---|---|---|---|---|---|---|---|---|---|
| | | | Composition (mol) | | | | | Coating of surface | Composition (wt. %) | | | Time for MA treatment (h) | | |
| | | | Li | a | b | c | d | Oxide | Coating amount (wt.) | Si | Sn | Ti | | |
| Comparative Example 1 | C1 | A5 | 1.500 | 0.450 | 0.850 | — | 0.200 | Al2O3 | 0.5 | 90 | — | 10 | 24 | 0.36 | 40 |
| Comparative Example 2 | C2 | A5 | 1.500 | 0.525 | 0.825 | — | 0.150 | Al2O3 | 0.5 | 90 | — | 10 | 24 | 0.36 | 40 |
| Comparative Example 3 | C3 | A5 | 1.500 | 0.375 | 0.875 | — | 0.250 | Al2O3 | 0.5 | 90 | — | 10 | 24 | 0.36 | 40 |
| Comparative Example 4 | C4 | A5 | 1.500 | 0.600 | 0.800 | — | 0.100 | Al2O3 | 0.5 | 90 | — | 10 | 24 | 0.36 | 41 |
| Comparative Example 5 | C5 | A5 | 1.500 | 0.300 | 0.900 | — | 0.300 | Al2O3 | 0.5 | 90 | — | 10 | 24 | 0.36 | 38 |
| Comparative Example 6 | C6 | A5 | 1.500 | 0.225 | 0.925 | — | 0.350 | Al2O3 | 0.5 | 90 | — | 10 | 24 | 0.36 | 37 |
| Comparative Example 7 | C7 | A5 | 1.500 | 0.450 | 0.850 | — | 0.200 | Al2O3 | 2.0 | 90 | — | 10 | 24 | 0.36 | 43 |
| Comparative Example 8 | C8 | A5 | 1.500 | 0.450 | 0.850 | — | 0.200 | ZrO2 | 0.5 | 90 | — | 10 | 24 | 0.36 | 42 |
| Comparative Example 9 | C9 | A5 | 1.500 | 0.450 | 0.850 | — | 0.200 | TiO2 | 0.5 | 90 | — | 10 | 24 | 0.36 | 43 |
| Comparative Example 10 | C10 | A5 | 1.500 | 0.450 | 0.850 | — | 0.200 | — | — | 90 | — | 10 | 24 | 0.36 | 36 |

As is apparent from the results presented in Tables 2 to 6, in the lithium ion secondary batteries of Examples 1 to 40 which are the electric devices according to the present invention, excellent cycle characteristics (capacity retention rate in 100th cycle) have been achieved.

REFERENCE SIGNS LIST

10 and 50 Lithium ion secondary battery
11 Negative electrode current collector
12 Positive electrode current collector
13 Negative electrode active material layer
15 Positive electrode active material layer
17 Separator
19 Single battery layer
21 and 57 Power generating element
25 Negative electrode current collecting plate
27 Positive electrode current collecting plate
29 and 52 Battery outer packaging material
58 Positive electrode tab
59 Negative electrode tab

The invention claimed is:

1. An electric device which comprises a power generating element including:
a positive electrode in which a positive electrode active material layer containing a positive electrode active material is formed on the surface of a positive electrode current collector;
a negative electrode in which a negative electrode active material layer containing a negative electrode active material is formed on the surface of a negative electrode current collector; and
a separator, wherein
the negative electrode active material layer contains a negative electrode active material represented by the following Formula (1):

$$\alpha(\text{Si-containing alloy}) \quad (1)$$

wherein α represents a percent by weight of each component in the negative electrode active material layer and $40 < \alpha \leq 98$,
the positive electrode active material layer contains a positive electrode active material represented by the following Formula (2):

$$e(\text{Solid-solution positive electrode active material}) \quad (2)$$

wherein e represents a percent by weight of each component in the positive electrode active material layer and $80 \leq e \leq 98$, and
wherein the Si-containing alloy has a structure including a silicide phase which contains a silicide of a transition metal and is dispersed in a parent phase containing amorphous silicon as a main component and a composition represented by the following Chemical Formula (I):

$$Si_xSn_yM_zA_a \quad (I)$$

wherein A is unavoidable impurities, M is Ti, x, y, z, and a represent values of percent by mass, and $0<x<100$, $0<y<100$, $0<z<100$, and $0 \leq a < 0.5$ and $x+y+z+a=100$,
a ratio value (B/A) of a diffraction peak intensity B of a silicide of a transition metal in a range of $2\theta=37$ to $45°$ to a diffraction peak intensity A of a (111) plane of Si in a range of $2\theta=24$ to $33°$ is 0.41 or more in an X-ray diffraction measurement of the Si-containing alloy using a CuKα ray, and
the solid-solution positive electrode active material contains an oxide-coated solid solution including a coating layer which contains an oxide or composite oxide of a metal selected from the group consisting of Al, Zr, and Ti and is formed on a particle surface of a solid solution having a composition represented by the following Formula (3):

$$Li_{1.5}[Ni_aMn_bCo_c[Li]_d]O_z \quad (3)$$

wherein z represents the number of oxygen satisfying the valence, a+b+c+d=1.5, 0.1≤d≤0.4, and 1.1≤[a+b+c]≤1.4, and wherein a content of the oxide or composite oxide in the solid-solution positive electrode active material is from 0.1 to 3.0% by weight in terms of oxide.

2. The electric device according to claim 1, wherein B/A is 0.89 or more.

3. The electric device according to claim 2, wherein B/A is 2.55 or more.

4. The electric device according to claim 3, wherein B/A is 7.07 or more.

5. The electric device according to claim 1, wherein the diffraction peak intensity A (cps) of the (111) plane of Si is from 6000 to 25000 and the diffraction peak intensity B (cps) of a silicide of a transition metal is from 9000 to 46000.

6. The electric device according to claim 1, wherein the diffraction peak intensity A (cps) of the (111) plane of Si is from 6000 to 15000 and the diffraction peak intensity B (cps) of a silicide of a transition metal is from 25000 to 46000.

7. The electric device according to claim 1, wherein the parent phase is more amorphized than the silicide phase.

8. The electric device according to claim 1, wherein a size of the silicide phase is 50 nm or less.

9. The electric device according to claim 1, wherein 7<z<100 in Chemical Formula (I) above.

10. The electric device according to claim 1, wherein a thickness of the coating layer is from 2 to 20 nm.

11. The electric device according to claim 1, which is a lithium ion secondary battery.

* * * * *